(12) United States Patent
Cohen et al.

(10) Patent No.: US 8,209,567 B2
(45) Date of Patent: Jun. 26, 2012

(54) MESSAGE CLUSTERING OF SYSTEM EVENT LOGS

(75) Inventors: Ira Cohen, Modiin (IL); Michal Aharon, Haifa (IL); Eli Mordechai, Modiin (IL); Gilad Barash, Tel Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 12/695,780

(22) Filed: Jan. 28, 2010

(65) Prior Publication Data

US 2011/0185234 A1   Jul. 28, 2011

(51) Int. Cl.
G06F 11/00   (2006.01)
G06F 11/34   (2006.01)

(52) U.S. Cl. ............. 714/45; 714/26; 714/39; 714/57

(58) Field of Classification Search ........... 714/26, 714/27, 39, 45, 57
See application file for complete search history.

(56) References Cited

U.S. PATENT DOCUMENTS

| | | | | |
|---|---|---|---|---|
| 5,448,722 A * | 9/1995 | Lynne et al. | ............ | 706/49 |
| 6,006,016 A * | 12/1999 | Faigon et al. | ............ | 714/48 |
| 6,343,236 B1 * | 1/2002 | Gibson et al. | ............ | 700/79 |
| 6,947,797 B2 * | 9/2005 | Dean et al. | ............ | 700/79 |
| 7,089,250 B2 * | 8/2006 | Doganata et al. | ............ | 1/1 |
| 7,788,370 B2 * | 8/2010 | Yugami | ............ | 709/224 |
| 7,895,470 B2 * | 2/2011 | Nastacio et al. | ............ | 714/25 |
| 8,095,830 B1 * | 1/2012 | Cohen et al. | ............ | 714/45 |
| 2005/0027717 A1 * | 2/2005 | Koudas et al. | ............ | 707/100 |
| 2005/0144526 A1 * | 6/2005 | Banko | ............ | 714/38 |
| 2006/0136417 A1 * | 6/2006 | Avinash et al. | ............ | 707/9 |
| 2006/0156077 A1 * | 7/2006 | Altaf et al. | ............ | 714/57 |
| 2008/0288482 A1 * | 11/2008 | Chaudhuri et al. | ............ | 707/5 |
| 2010/0306587 A1 * | 12/2010 | Liu et al. | ............ | 714/26 |

OTHER PUBLICATIONS

Demanding More from Log Management Systems, Jerry Shenk, A Sans Whitepaper, Jun. 2008, http://www.sans.org/reading_room/analysts_program/LogMgt_June08.pdf.
M. Aharon, M. Elad, and A.M. Bruckstein, "The K-SVD: An Algorithm for Designing of Overcomplete Dictionaries for Sparse Representation", the IEEE Trans. On Signal Processing, vol. 54, No. 11, pp. 4311-4322, Nov. 2006.
M. Elad and M. Aharon, "Image Denoising Via Sparse and Redundant representations over Learned Dictionaries", the IEEE Trans. on Image Processing, vol. 15, No. 12, pp. 3736-3745, Dec. 2006.
M. Proffer and Michael Elad, "Image Sequence Denoising Via Sparse and Redundant Representations", IEEE Trans. on Image Processing, vol. 18, No. 1, pp. 27-36, Jan. 2009.
O. Bryt and M. Elad, "Compression of Facial Images Using the K-SVD Algorithm", Journal of Visual Communication and Image Representation, vol. 19, No. 4, pp. 270-283, May 2008.
D. M. Blei, A. Y. Ng, and M. I. Jordan. Latent dirichlet allocation. Journal of machine Learning Research 3, 2003.
Ira Cohen, M. Goldszmidt, T. Kelly, J. Symons, and J. S. Chase. Correlating instrumentation data to system states: A building block for automated diagnosis and control. In Proc. 6th USENIX OSDI, San Francisco, CA, Dec. 2004.

(Continued)

*Primary Examiner* — Joseph Schell

(57) ABSTRACT

An automated method of processing computer system event logs comprises receiving event messages associated with one or more system event logs, each event message including event text, determining a set of message clusters, each comprising a template text, representative of the event messages across the one or more event logs, and assigning each event message to a message cluster of the set, according to a measure of similarity between the respective event text of the event message and the template text of the message cluster.

18 Claims, 14 Drawing Sheets

OTHER PUBLICATIONS

I. Cohen, S. Zhang, M. Goldszmidt, J. Symons, T. Kelly, and A. Fox. Capturing, indexing, clustering, and retrieving system history. In Proc. 20th ACM SOSP, 2005.

Rob Powers, Ira Cohen, and Moises Goldszmidt, "Short term performance forecasting in enterprise systems", SIGKDD 2005.

Wei Peng, Charles Perng, Tao Li, and Haixun Wang. Event Summarization for System Management. SIGKDD 2007.

Joseph L. Hellerstein, Sheng Ma, and Chang-Shing Perng. Discovering actionable patterns in event data. IBM System Journal, 41(3):475, 2002.

Tao Li, Feng Liang, Sheng Ma, and Wei Peng. An integrated framework on mining logs Files for computing system management. In SIGKDD 2005.

S. Sabato, E. Yom-Tov, A. Tsherniak, S. Rossetm Analyzing System Logs: A New View of What's Important, Second Workshop on Tackling Computer Systems Problems with Machine Learning Techniques (SysML07). (2007).

Wei Xu, Ling Huang, Armando Fox, David Patterson, Michael Jordan, Mining Console Logs for Large-Scale System Problem Detection, SysML 2008.

* cited by examiner

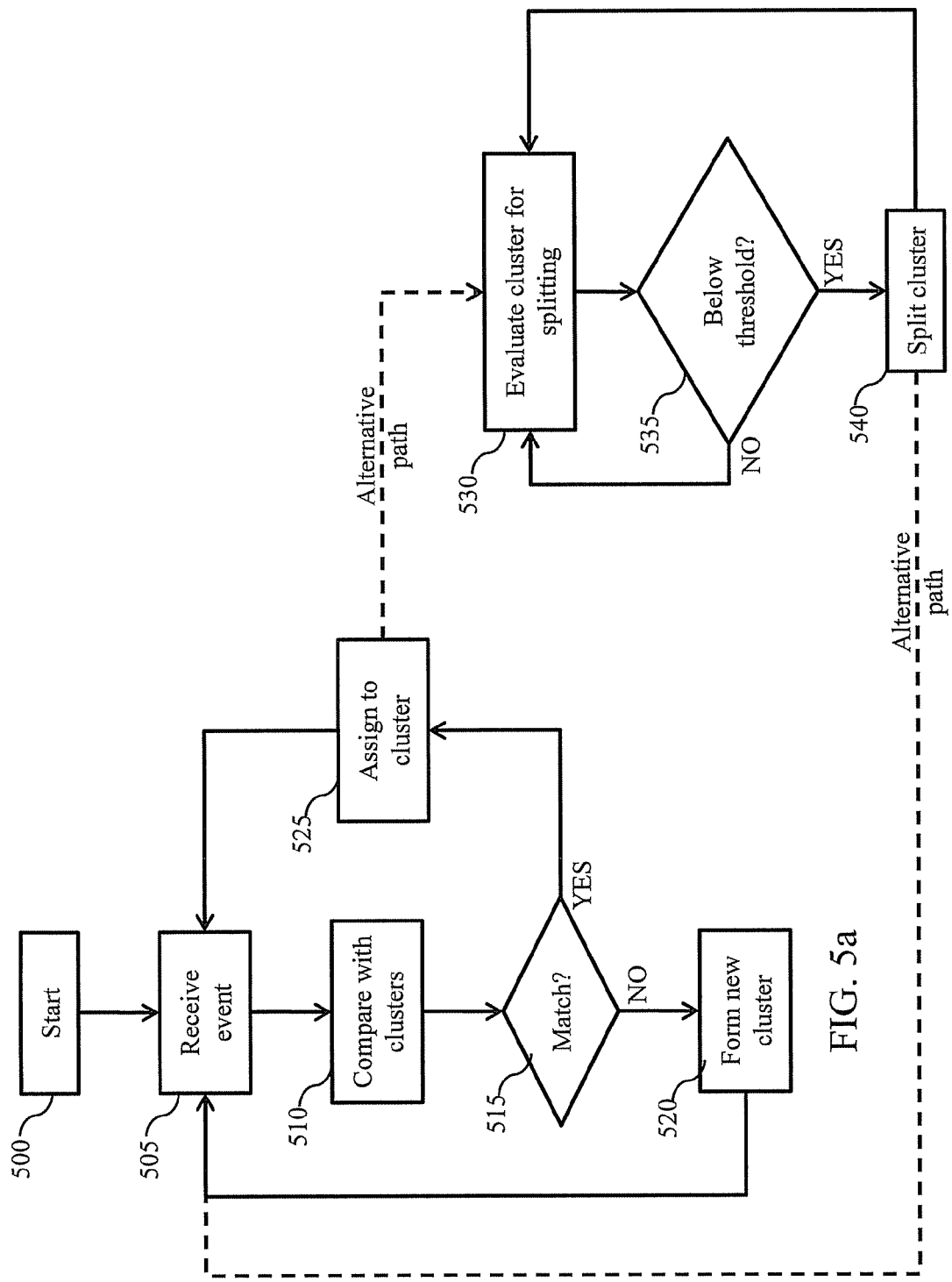

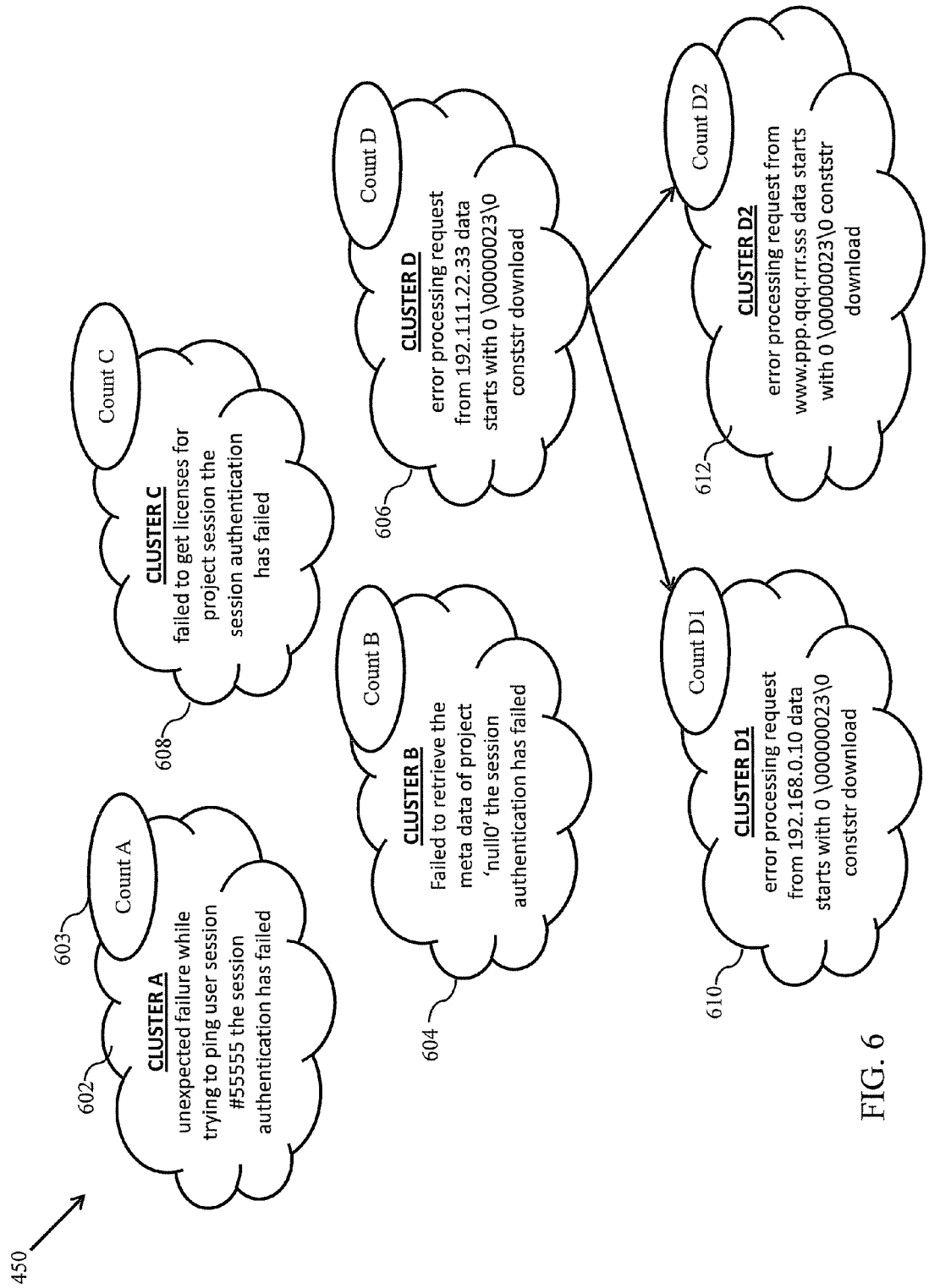

| | 440 → | |
|---|---|---|
| 2008-02-06 14:35:16 | unexpected failure while trying to ping user session #55555 the session authentication has failed | A |
| 2008-02-06 14:35:17 | failed to retrieve the meta data of project 'null0' the session authentication has failed | B |
| 2008-02-06 14:35:19 | failed to get licenses for project session the session authentication has failed | C |
| 2008-02-06 14:35:19 | error processing request from 192.111.22.33 data starts with 0 \00000023\0 conststr download | D |
| 2008-02-06 14:35:39 | unexpected failure while trying to ping user session #44444 the session authentication has failed | A |
| 2008-02-06 14:35:40 | failed to retrieve the meta data of project 'null1' the session authentication has failed | B |
| 2008-02-06 14:35:41 | unexpected failure while trying to ping user session #33333 the session authentication has failed | A |
| 2008-02-06 14:35:41 | failed to get licenses for project session the session authentication has failed | C |
| 2008-02-06 14:50:08 | failed to get licenses for project session the session authentication has failed | C |
| 2008-02-06 14:50:09 | error processing request from 192.111.22.33 data starts with 0 \00000014\0 conststr download | D |
| 2008-02-06 14:50:11 | Failed to retrieve the meta data of project 'null3' the session authentication has failed | B |
| 2008-02-06 14:50:14 | error processing request from 192.111.22.33 data starts with 0 \00000512\0 conststr download | D |

| | 440 → |
|---|---|
| 2008-02-06 14:35:16 | A |
| 2008-02-06 14:35:17 | B |
| 2008-02-06 14:35:19 | C |
| 2008-02-06 14:35:19 | D |
| 2008-02-06 14:35:39 | A |
| 2008-02-06 14:35:40 | B |
| 2008-02-06 14:35:41 | A |
| 2008-02-06 14:35:41 | C |
| 2008-02-06 14:50:08 | C |
| 2008-02-06 14:50:09 | D |
| 2008-02-06 14:50:11 | B |
| 2008-02-06 14:50:14 | D |

| Source | Time Frame | Number of messages | Number of unique messages | Number of clusters | Number of distinct words | Median message length | Index size reduction |
|---|---|---|---|---|---|---|---|
| Business Application 1 | Start: 10/01/2008 06:00 End: 03/09/2008 11:14 | 4,210,513 | 153,619 | 4,193 | 112,112 | 25 | 90% |
| Printing Press | Start: 14/04/2008 22:09 End: 14/04/2008 22:12 | 11,204 | 5,631 | 204 | 1,796 | 10 | 50% |
| Windows Events | Start: 05/09/2006 01:55 End: 19/06/2009 02:38 | 66,102 | 25,340 | 476 | 14,550 | 26 | 40% |
| Business Application 2 | Start: 25/01/2009 13:19 End: 23/03/2009 09:06 | 483,768 | 70,102 | 1,115 | 42,057 | 10 | 90% |

FIG. 8

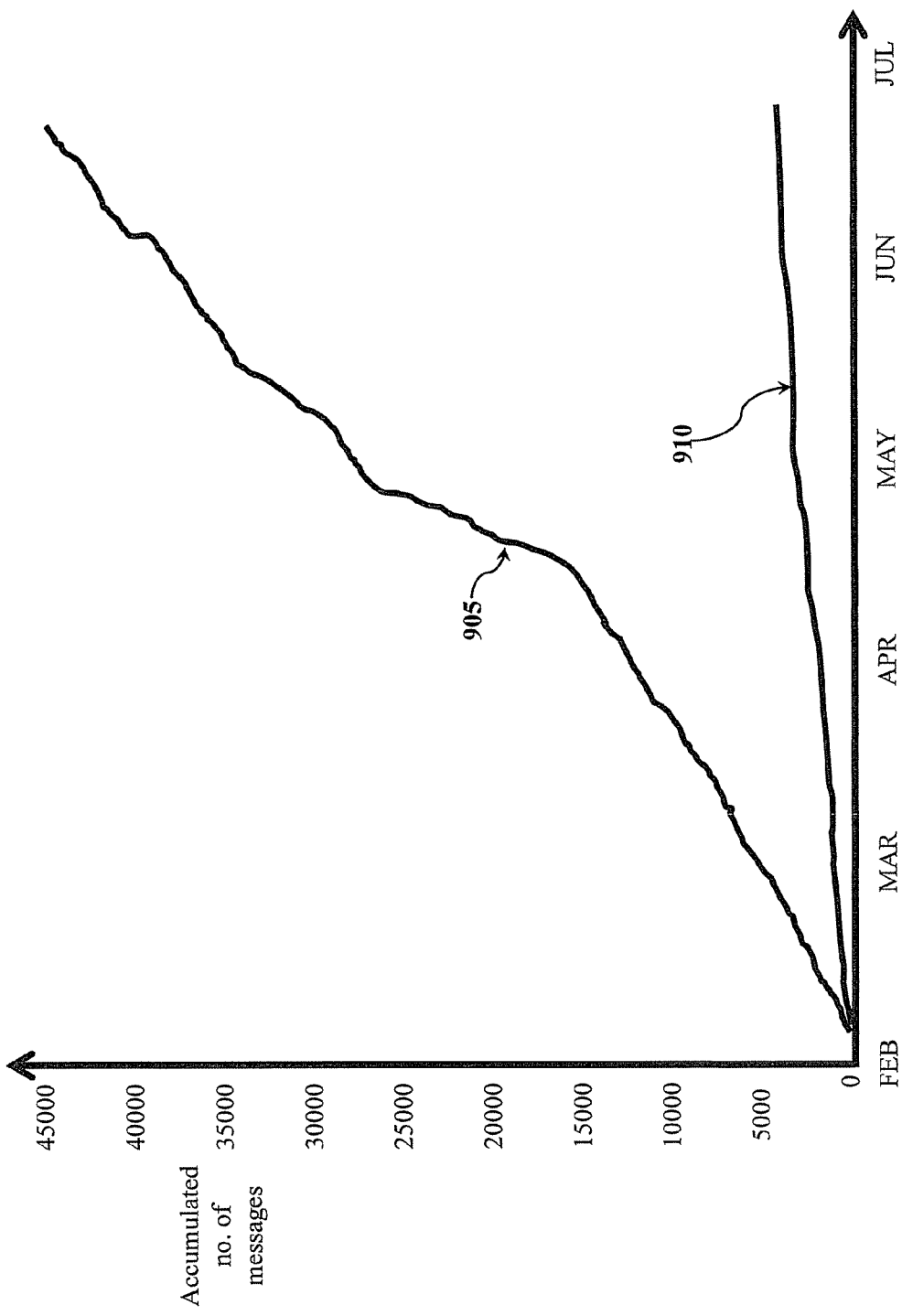

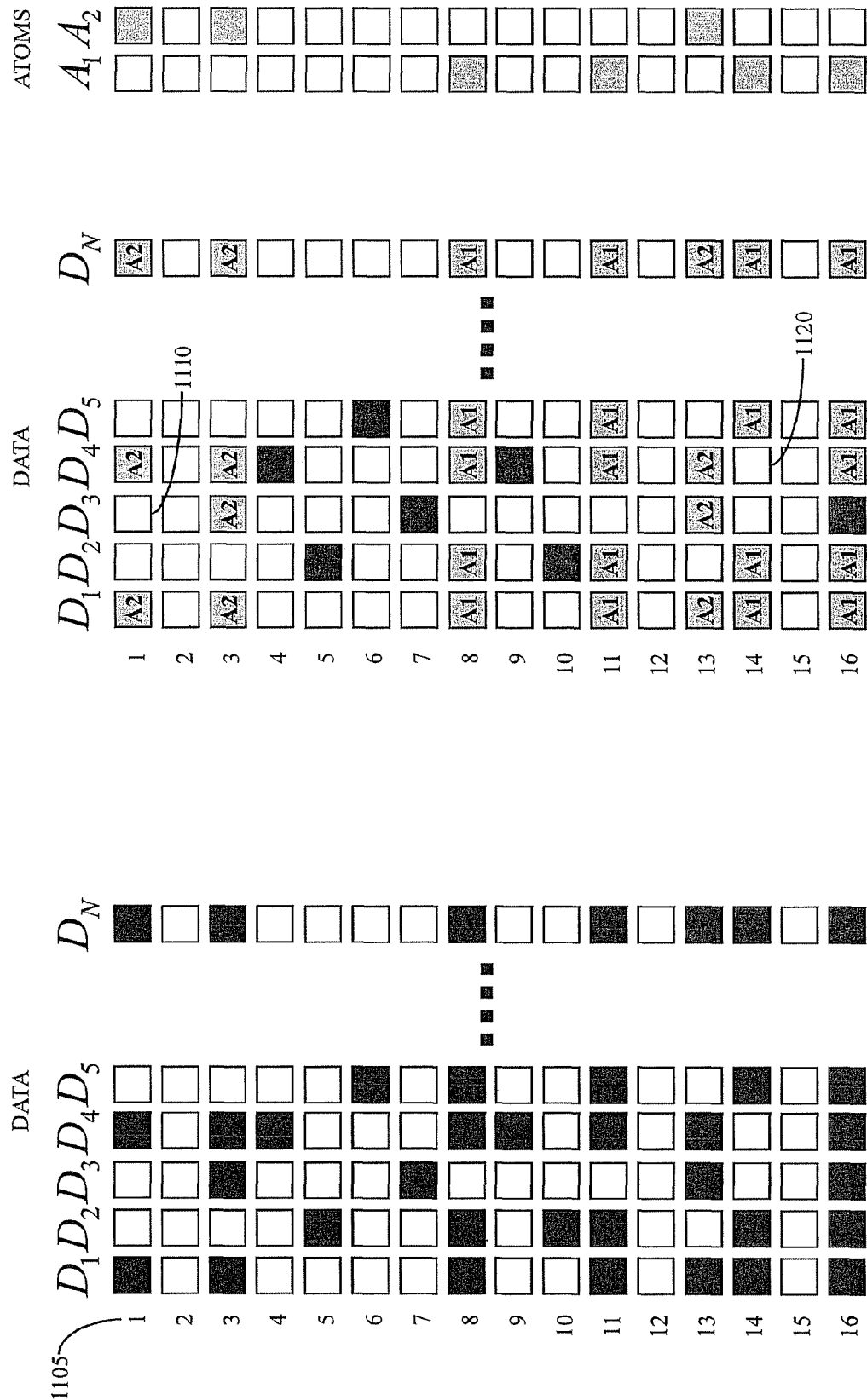

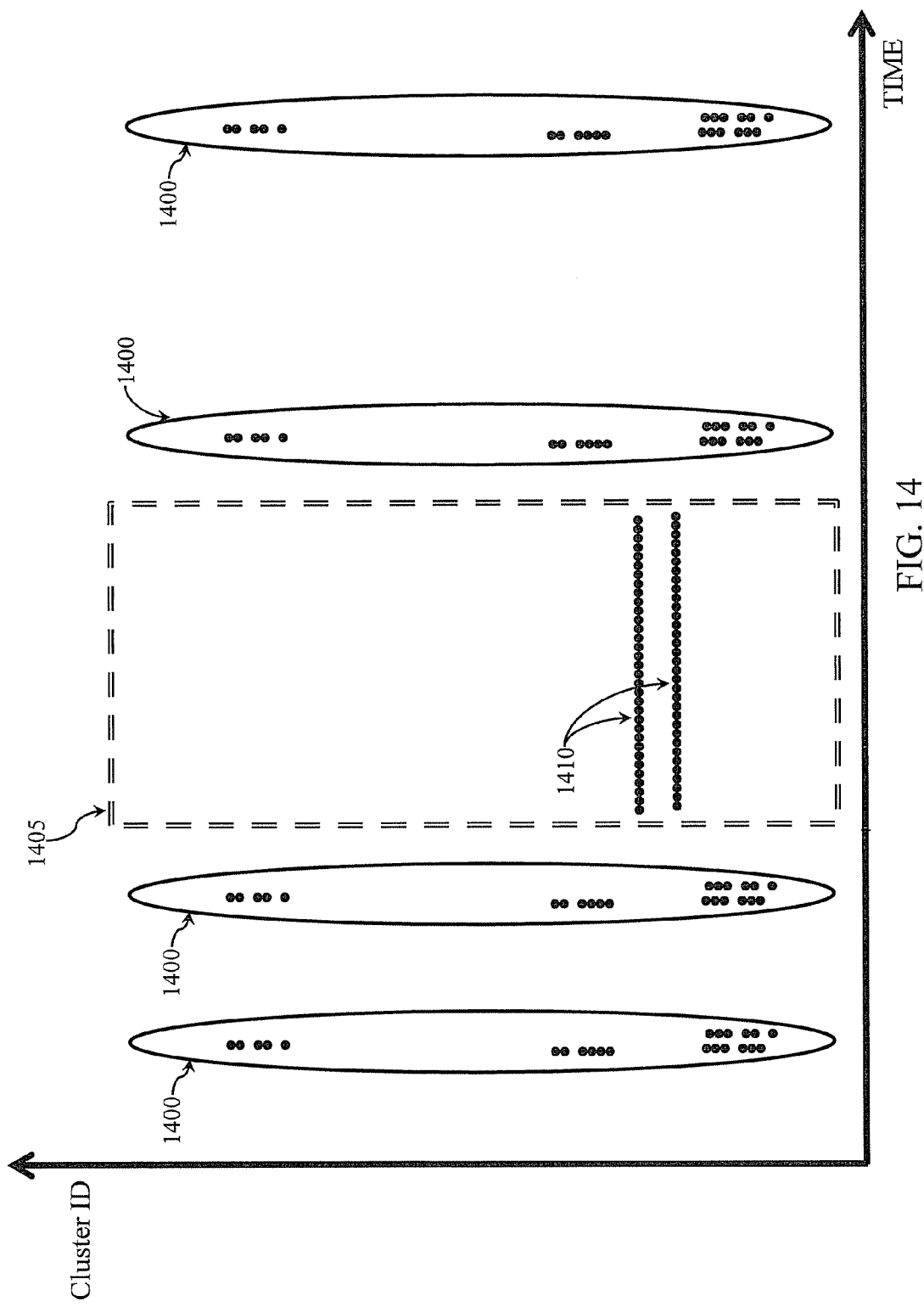

MESSAGE CLUSTERING OF SYSTEM EVENT LOGS

BACKGROUND

Almost every piece of computer software writes human-readable, textual event messages, or simply "events" into event logs. Computer systems composed of many application (hardware and/or software) components, such as web services, complex enterprise applications and even complex printing presses and storage systems, collect such events from their many components into system event log files, or simply "logs". These logs, which are typically stored on networked servers, can be used in system development and for debugging and understanding the behaviour of a system.

While logs hold a vast amount of information describing the behaviour of systems, finding relevant information within the logs can be a very challenging task; even modest systems can log thousands of messages per second. While it is possible to use traditional Unix "grep" for finding potentially relevant messages in event logs, existing commercial tools, such as those from Splunk, LogLogic and Xpolog, can collect and join logs from different sources and provide a more convenient search through the logs. However, the indexing provided by these tools still does not lead to automation in leveraging the logs for tasks such as automated problem debugging, process identification or visualization of the information in the logs.

Existing research in the area of automated log analysis focuses on discovery of temporal patterns, or correlation of event statistics, within the events. Such techniques are typically based on knowledge of which event messages can occur, or require access to the source code of software that generates the event messages in order to determine which event messages can occur. In general, the research does not accommodate the complexities of real world systems, in which logs may be generated by various different components in a complex system, leading to, for example, interleaving of sequences of events, asynchronous events and high dimensionality.

BRIEF DESCRIPTION OF THE DRAWINGS

Various features and advantages of the invention will become apparent from the following description of embodiments of the invention, given by way of example only, which is made with reference to the accompanying drawings, of which:

FIG. 1a is an extract from an exemplary computer system log file and FIG. 1b is the same extract re-arranged to identify four event message templates found in FIG. 1a;

FIG. 5a is a flow diagram illustrating one way of deriving message clusters according to an embodiment of the present invention and FIG. 5b is a flow diagram illustrating one way of splitting message clusters according to an embodiment of the present invention;

FIG. 6 is a graphical depiction of clusters that have been formed according to the process in FIG. 5a and split according to the process in FIG. 5b;

FIG. 7a is the extract of FIG. 1a, adapted to show cluster assignments and FIG. 7b is a representation of a reduced log after message cluster assignment;

FIG. 8 is a table showing results of applying an embodiment of the invention to various source computer system log files;

FIG. 9 is a graph showing how the number of distinct messages received in a log file grows over time compared with the growth of the number of template messages over the same period of time;

FIG. 11a is a graphical depiction illustrating a vector representation of cluster occurrences over a sequence of time windows, and FIG. 11b is a graphical depiction illustrating a vector representation of atoms identified from the same time windows;

FIG. 14 is a graph illustrating the occurrence over time of message clusters of a computer system, and including a mapping of various clusters to identifiable computer system events.

DETAILED DESCRIPTION

Figure 1A:
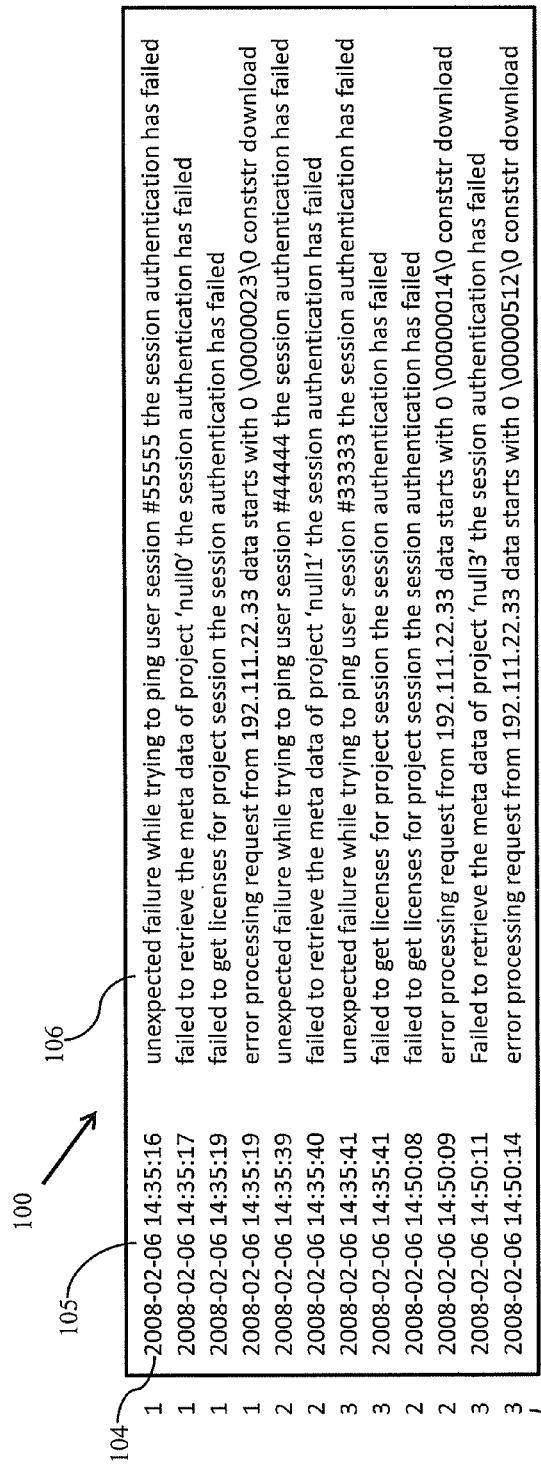

Various embodiments of the present invention will now be described in more detail with reference to the accompanying drawings. It will be appreciated that the invention is not limited in its application to the details of methods and the arrangement of components as set forth in the following description or illustrated in the drawings. It will be apparent to a person skilled in the art that additional embodiments of the present invention not detailed in the description are possible and will fall within the scope of the present claims. Accordingly, the following description should not be interpreted as limiting in any way, and the scope of protection is defined solely by the claims appended hereto.

Embodiments of the present invention generally relate to log analysis and log analysers. According to an embodiment of the present invention, log analysis involves generating a dictionary of event types, comprising a limited set of templates that represent the events in the logs. The templates are then used to identify groups of related events, for example, where each group may relate to one kind of system or application software (or a respective component thereof) process or failure. The result is, effectively, a conversion of system event logs from semi-structured text to a form which can be machine-read and can advantageously be used in various systems analysis, problem solving, and other computer system related tasks, as will be described hereinafter in detail.

According to an embodiment of the invention, the generation of the dictionary applies a translation of text based event messages in respective logs into the dictionary of event types. It will be appreciated that the number of templates used for creating events is typically limited, but the actual number of distinct events observed can be very large, and can grow quickly as a function of time. One reason for this is that the actual messages in the logs include various variable parameters that change from instance to instance of the same type of message (e.g., a user name in a string such as "login user $name"). Unfortunately, in many systems, the event templates generating the messages are not known or published and are not readily available—at least not in advance of operating the system and investigating the resulting logs—making it challenging to compute representative statistics enabling automated analysis over the events.

According to an embodiment of the invention, identifying groups of related events is achieved by applying a pattern-finding mechanism to provide a compressed/concise representation of processes represented in the logs. Many processes spawn multiple messages into logs: for example, a failure of a process can cause multiple messages to appear in different logs representing the output of different software components, creating interleaved sequences of events in the respective logs. As will be demonstrated herein, automated systems can benefit greatly from identification and representation of such groups of related events, as opposed to individual messages, as it reduces noise (i.e. meaningless, erroneous, missing, incomplete or difficult-to-interpret information), compresses the data and facilitates a more accurate representation of processes in the system.

Before embarking on a more detailed description of an embodiment of the invention, an extract from an exemplary log file 100, as shown in FIG. 1a, will be described in order to illustrate one or more problems considered herein.

Logs comprise semi-structured events generated automatically when software or hardware components output messages describing actions, warnings or errors during their operation. FIG. 1a shows an illustrative extract from an exemplary log file 100, including twelve individual events 104. An event 104 typically has a timestamp 105, representing the date and time at which the software generated the event, and at least a textual narrative 106 describing the event. In some events additional fields might appear (not shown), for example describing severity level, source method/function, etc.

Figure 1B:
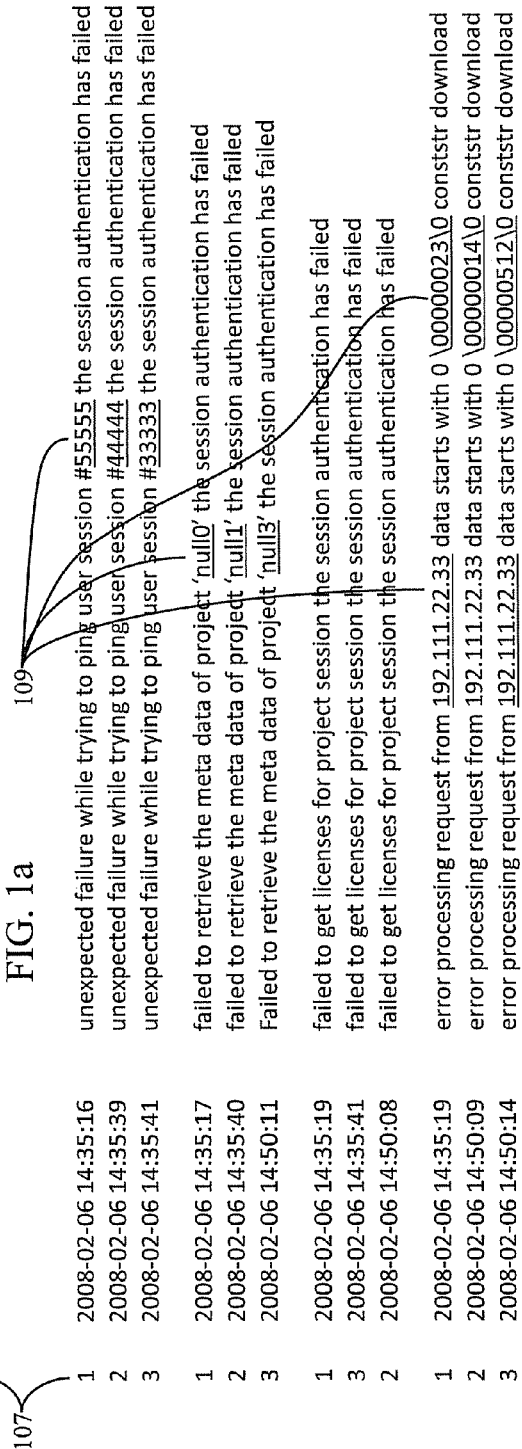

Even though there are twelve events shown in the log file in FIG. 1a, it is apparent by inspection that only four message templates have been used to generate the messages, and that there are only ten distinct (i.e. completely different) messages. The four templates are illustrated in the re-arranged table shown in FIG. 1b. The ten distinct messages result from variables 109 (i.e. numbers, words or and symbols) in the narrative 106 that have been inserted into the templates. In this example, the variables 109, which have been underlined for ease of reference in FIG. 1b, are IP addresses, user session #, project names and conststr identifiers. If the templates were known in advance, it would be relatively easy to map each message to its generating template. However, as already indicated, such templates are in practice rarely known in advance. In addition, the number of events with distinct messages in the log files has been found to be represented by between 10-70% of the total number of events. With millions of events, even automated analysis on the event log time sequence becomes difficult.

A second type of behaviour has been observed in logs when a system reaches a certain state; causing different software components to output log entries, sometimes in an ordered sequence, and sometimes unordered. The events in FIG. 1a are found to comprise three sequences (identified by 1, 2 or 3), each caused by the same application state—a failure to authenticate a user session. The 1, 2 and 3 designations 107 are not a part of the log file 100 and have been added for illustration purposes only. While some of the event types always occur when an authentication failure occurs (e.g. the first three events in FIG. 1a), the fourth event, 'error processing request from . . . ' is found to occur in other states as well.

It has been found desirable, therefore, according to embodiments of the invention, to capture such processes and represent them as one event for better characterisation of the system behaviour. This requires automatically discovering such event sequences from the massive logs, a prerequisite for which is that log events can be compared and matched. A further challenge arises from the fact that log entries may represent multiple system states at the same time, leading to interleaved sequences (e.g., events in sequence 2 and 3 in FIG. 1a are interleaved), each representing the same or a different state; e.g., a user session authentication failure may occur at the same time as a failure to update a database—the logs would typically represent interleaved events from the two failures, without clear indication of the source of the failure.

Figure 2:
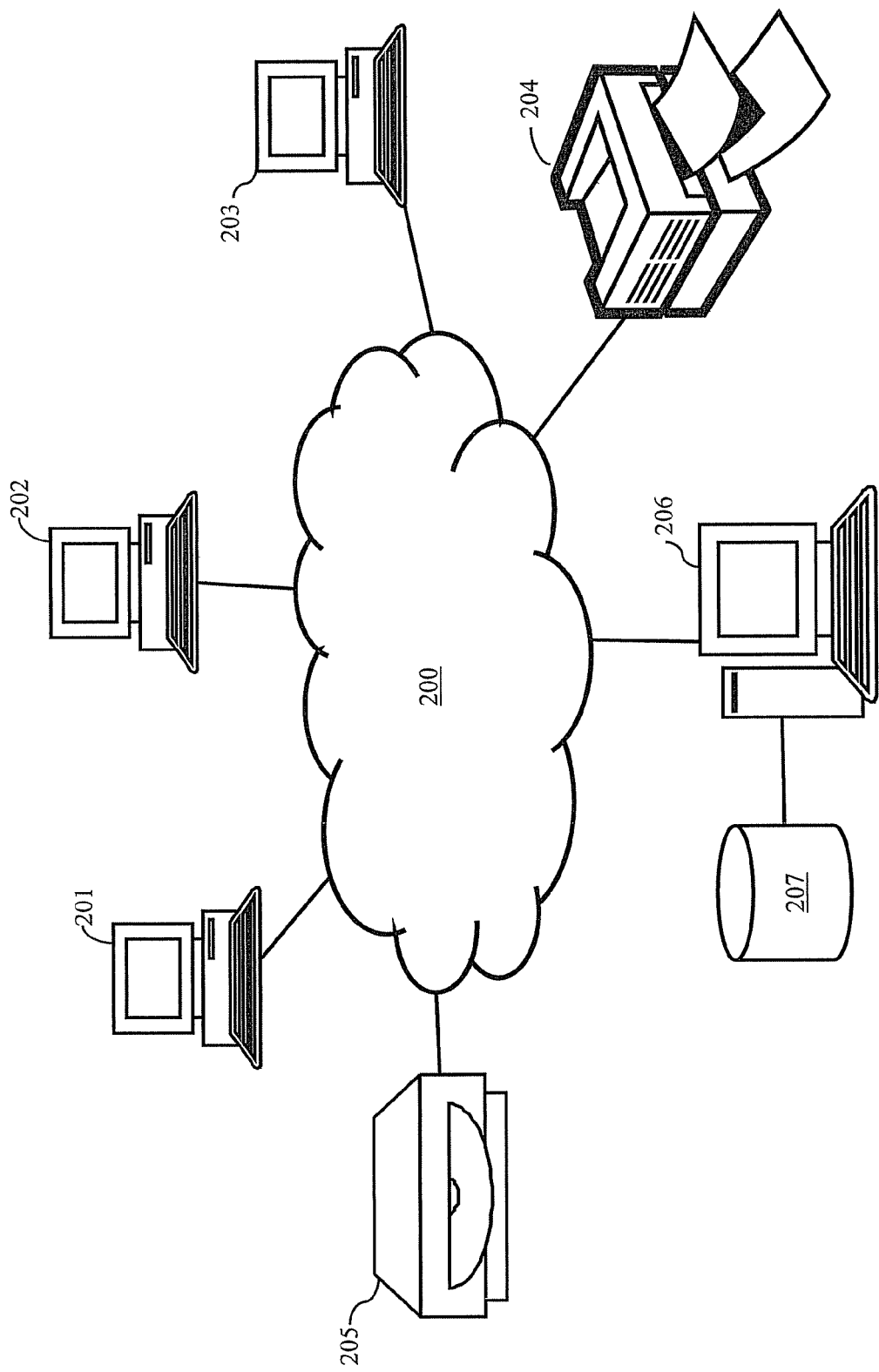
FIG. 2 is a schematic block diagram of an exemplary computer system environment in which embodiments of the present invention may be applied.

A system environment in which embodiments of the present invention may be practised is illustrated in the diagram in FIG. 2. The environment includes a network 200, for example an enterprise intranet, or any other arrangement or combination of one or more network types including the Internet. Connected to the network are three computers, 201, 202 and 203, which may be personal computers or servers, a network attached printer 204, which can be anything from a laser printer to a large-scale printing press, and a network-attached storage device 205, which may be anything from a single disk drive to a storage library, for example.

According to FIG. 2, also attached to the network 200 is a network management computer system (NMS) 206, running software applications for controlling, monitoring and configuring the network. Such NMS are known and may run a network management software application, such as Hewlett Packard™ OpenView™. Any one or more of the devices and systems, 201-206 that are connected to the network 200 may generate log file events. Typically, the devices and systems are configured to communicate the events to the NMS 206. The NMS 206 stores received events in one or more log files, for example similar to that shown in FIG. 1, on a storage device, such as hard disk storage 207.

Figure 3:
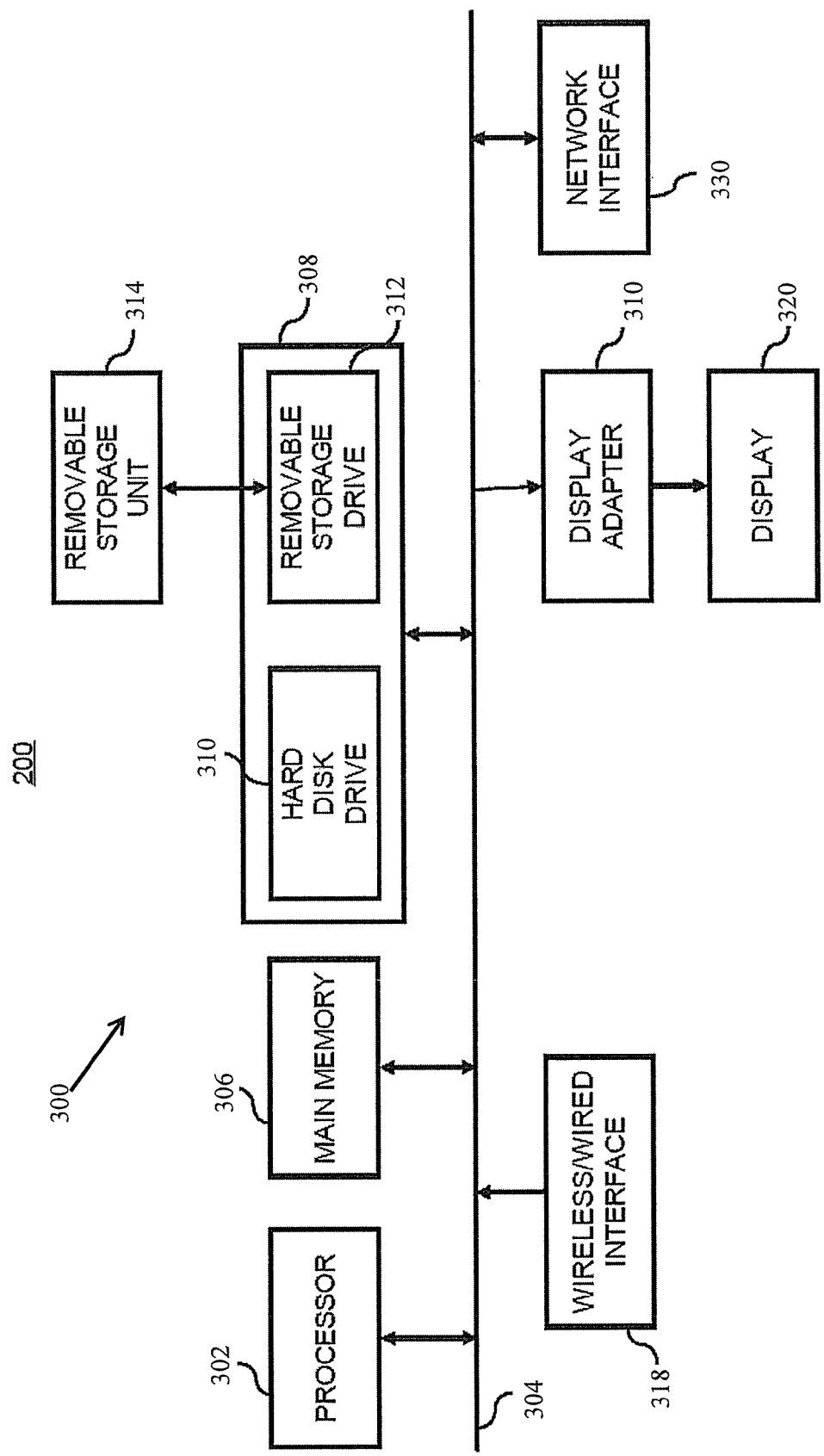
FIG. 3 is a schematic block diagram of a computer architecture of a computer system such as a network management system on which embodiments of the present invention may be implemented.

The NMS 206 is illustrated in more detail in the diagram in FIG. 3. The NMS 206 includes one or more processors 302 providing an execution platform for executing software. Thus, the NMS 206 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 302 are communicated over a communication bus 304 or through point-to-point links (not shown) with other components in the NMS 206.

The NMS 206 also includes a main memory 306 where software is resident during runtime, and a secondary memory 308. The secondary memory 308 may also be a computer-readable medium that may be used to store software programs, applications, or modules that implement the methods (as described later), or parts thereof. The main memory 306 and secondary memory 308 (and an optional removable storage unit 314) each includes, for example, a hard disk drive and/or a removable storage drive 312 representing a floppy diskette drive, a magnetic tape drive, a compact disk drive, etc., or a non-volatile memory where a copy of the software is stored. In one example, the secondary memory 308 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The NMS 206 includes a display 320 connected via a display adapter 322, user interfaces comprising one or more input devices 318, such as a keyboard, a mouse, a stylus, and the like. However, the input devices 318 and the display 320 are optional. A network interface 330 is provided for communicating with other computer systems via, for example, the network 200.

Log analysis, according to embodiments of the present invention, may be implemented by a dedicated hardware module, such as an ASIC, in one or more firmware or software modules, or in a combination of the same. A firmware embodiment would typically comprise instructions, stored in non-volatile storage, which are loaded into the CPU 302 one or more instructions at a time, to control the NMS 206 according to embodiments of the invention. A software embodiment would typically comprise one or more application programs that is/are loaded from secondary memory 308 into main memory 306, when the programs are executed.

Figure 4:
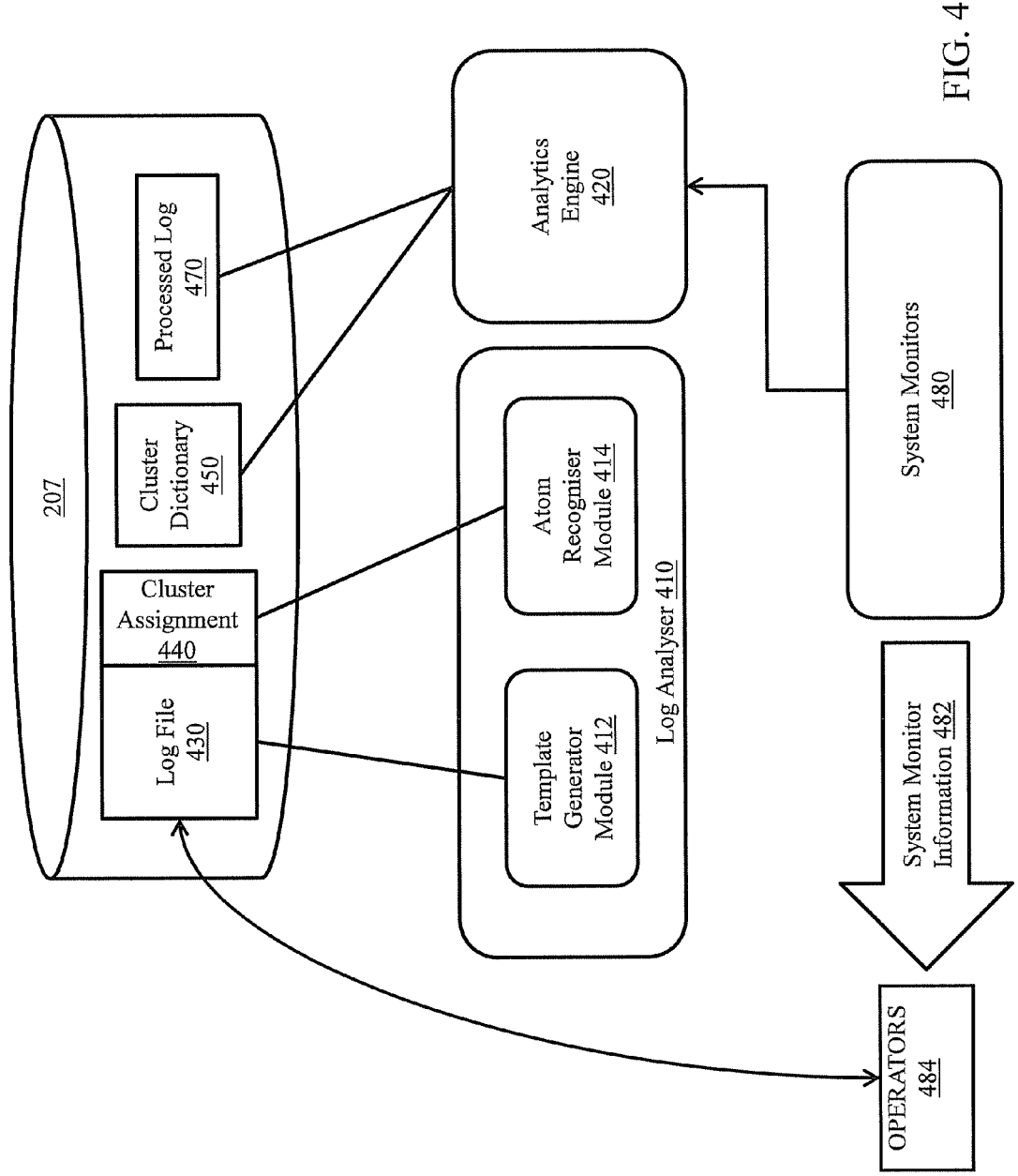
FIG. 4 is a functional block diagram of an embodiment of the present invention.

The diagram in FIG. 4 illustrates functionally a log processing system 400 operable according to an embodiment of the present invention. The system 400 comprises a log analyser 410 and an analytics engine 420, each of which has data read and write access to the disc storage 207, and particularly to one or more log files 430 and other data structures stored therein, including in this example cluster assignment data 440, a cluster dictionary 450 and a processed log 470. According to an embodiment of the invention, the log analyser 410 and analytics engine 420 are realised as software applications that are loaded into main memory 306 and executed on the NMS 206. The diagram also shows system monitors 480, which are known in the prior art and can, optionally, be employed according to embodiments of the present invention.

Of course, the log files and other data structures (or parts thereof) may be loaded into main memory 306 to afford faster read and write operations, and then loaded back into the disk storage 310 when read and write operations are completed. The manner of storage and data read/write operations is not important to the present invention, as long as the processes are sufficiently fast.

The log analyser 410 comprises a template generator module 412 and an atom recogniser module 414, the operations of which according to an embodiment of the invention will now be described in more detail.

Template Generator Module 412

For the following purposes, each log event, e, will be denoted by a tuple (t,msg), where t is the timestamp 105 of the message and msg is the message text 106, represented by the word vector msg=$w_1, w_2, \ldots, w_n$, where $w_i$ is the word in the i'th position, while n is the number of words in a message. Each $w_i$, represents a word from all the words present in the logs, and the set of log entries is E.

A first problem is to discover a set of message clusters C=$c_1, c_2, c_3, \ldots, c_k$, where k<<|E|, and map each event e(t,msg) to one of the clusters, leading to the new representation of each event as (t, $c_i$), as illustrated in FIG. 7b, which is described hereinafter. The set of message clusters forms the cluster dictionary 450 (i.e. dictionary of event types), with each cluster representing (and being represented by) a message event template text.

To create the cluster dictionary 450, mapping the events to a typically much smaller set of message clusters, applies the assumption that messages produced by the same template (albeit unknown in advance) are usually identical in many of the words, with differences only at various variable parameters. Additionally, word ordering is typically important. Therefore, it is assumed that any appropriate similarity function needs to take word ordering into account. According to an embodiment of the invention, an order-sensitive cosine similarity function may be applied to provide a measure of similarity (i.e. a 'distance') of two messages. Such a function may take the form:

$$\langle msg_1, msg_2 \rangle = \frac{n_{12}}{\sqrt{n_1 \cdot n_2}}, \qquad \text{(Equation 1)}$$

where $n_{12}$ is the number of identical words comparing each word position of $msg_1$ and $msg_2$, and $n_1$, $n_2$ are the numbers of words in each message.

A resulting cosine distance is a number between 0 and 1. When the result is 1, the two messages are identical, and when the result is 0, the two messages are completely different. Values between 1 and 0 represent a measure or degree of similarity.

An alternative to the cosine similarity defined above would be an edit distance, or variations of it, allowing for word insertions and deletions. However, it has been found through experiment that, in practice, there is little need for a more complex function and using it adds a significant computational overhead. In any event, the skilled person will appreciate that there are various different known techniques for calculating similarity in this context, bearing in mind the associated trade-offs between accuracy and efficiency.

Any suitable function may be applied in embodiments of the present invention. In general, it has been found that suitable algorithms for message comparison and cluster generation tend to meet at least one or more of the following criteria:

a. Efficient: given the massive amount of log events, any algorithm must process the logs very quickly, keeping up at least with the rate of incoming messages. The algorithm described herein is linear time in terms of number of messages, and was found by experiment using modest processing capabilities to be able to process 25,000 messages per second, keeping up with all systems encountered so far.

b. Produce values immediately: the algorithm described herein is an 'online' algorithm, producing new clusters as needed as more messages are observed. In contrast, an 'offline' method would process historic logs.

c. Consistency of clusters: two messages that belonged to the same cluster at time t, should not belong to different clusters at time t+1, otherwise it can result in conflicting conclusions depending on t. The algorithm described herein builds a so-called 'forest' of cluster trees, and ensures that matching messages are always a part of the same tree in the forest, thus maintaining global consistency.

d. Similar messages with different semantics or frequent parameter values should be in separate clusters: it has been appreciated that two messages can be almost identical in terms of matching words, while the semantics can be very different—for example, "network is up" vs. "network is down" (often the message can be much longer, with the only difference being the words "up" and "down"). Additionally, for example, a message "login user $name" could have many instances where $name="root", and many other instances with varying names. According to an embodiment of the present invention, events including, for example, many instances of the user "root" would typically be considered separately (i.e. having their own cluster) from the others. Put another way, the algorithm described herein, according to an embodiment of the present invention, is adaptive and splits clusters based on the entropy of word positions in the messages and the words within each position to maintain relatively high entropy among the members of a cluster in the word positions considered to be parameters.

The cluster dictionary 450 described according to the present embodiment is produced using a template generator module algorithm that applies each of the criteria a-d, as will now be described with reference to the flow diagram in FIG. 5a and the illustrative cluster dictionary in FIG. 6. The cluster dictionary 450 is illustrated schematically and, in practice, may be arranged as any appropriate form of data structure, for example a text file, table, database, xml file, etc. Each cluster 602 in the cluster dictionary 450 includes at least an event template, comprising the text 106 (or some other appropriate representation of the text, such as, for example, an encoded or hashed variant or a pointer to the text in a template database or the like) of a representative log event message, and a message count 603, indicating the number of times a log event message has been assigned to the cluster. In effect, each cluster represents a prototypical feature message according to a representative message.

The template generator module algorithm begins [step 500], with zero or more clusters defined in the cluster dictionary 450. A first event is read from the log file [step 505] and compared with existing clusters [step 510], using Equation 1, to see if the event matches the template in any existing cluster.

In the present example, the first message is the first message in the log file in FIG. 1, and there is not any existing cluster in the cluster dictionary 450. As there is no cluster to which the cosine distance is larger than a pre-defined threshold (e.g. 0.85), a new cluster 602 is defined using the event text as the template text for the new cluster [step 520]. Such a new cluster is designated CLUSTER A in FIG. 6; though any other form of convenient reference or cluster ID scheme could be used. In general, if there exists a cluster to which the cosine distance is equal to or larger than the pre-defined threshold (e.g. 0.85), then the event is deemed to match the cluster and is assigned to that cluster [step 525]: a record of the assignment is made in the cluster assignment record 440, which is associated with the log file, and the respective message count 603 for the matched cluster is incremented. The cluster assignment record 440 may simply be an additional column or field in a log file 700 against each log event 704, as illustrated in FIG. 7a. The log file extract in FIG. 7a is generally the same extract as in FIG. 1a, with the addition of the cluster assignment 440. Once the clusters have been assigned to event messages, each event in the event log(s) can be represented as $(t, c_i)$, as described above, where t is the timestamp and $c_i$ is the assigned message cluster.

The pre-defined threshold can be determined heuristically by applying the process to a real data set—for which a higher threshold would lead to more clusters and a lower threshold would lead to fewer clusters—to establish what threshold provides the most accurate clustering. Of course, the threshold may need to be different in different systems, depending on the nature of the events that are generated.

According to the present embodiment, each new event is compared to the template in each of the existing clusters in the order in which the clusters were created, and is assigned to the first cluster to which the similarity threshold is exceeded; this ensures the satisfaction of the consistency requirement, c., above. In effect, an event is assigned to the first cluster with which is exceeds the threshold, even though a later cluster might be a closer match. If the similarity threshold is not surpassed for any of the existing clusters, a new cluster is created and the event text is used as the event template of the new cluster.

Finally [step 525] the process iterates when the next event is received [step 505].

In the present example, it can be seen that text in the second event in the log file extract in FIG. 7a is very different from the text in the first event, even though each event comprises 14 words. As shown by the dotted arrows, the first nine words in each event are not the same; however the final five words in each event are the same, as represented by solid arrows. Applying Equation 1 to these two events provides the similarity measure of $5/14=0.357$, which is below the threshold of 0.85 and means that the second event forms CLUSTER B 604, and the second event is assigned cluster B 440 in the cluster assignment 440. In contrast, the text in the fifth event in the log is the same as the text in the first event, apart from the $9^{th}$ words in each, which are 55555 and 44444 respectively. Applying Equation 1 to the first and fifth events provides the similarity measure of $13/14=0.929$, which is above the threshold of 0.85. Hence the fifth event does not form a new cluster. Instead, it is assigned to cluster A in the cluster assignment 440 and the message count 603 for cluster A is incremented by one.

According to the present embodiment, a cluster splitting process is enacted. The cluster fitting process has been found to render subsequent cluster assignments more accurate. Cluster splitting may be handled offline (i.e. periodically, e.g. according to a fixed time period or after a fixed number of log events have been received, or by any other appropriate definition), or online. With reference to the flow diagram in FIG. 5b (ignoring for the time being the dotted paths emanating from step 525 and step 545), in a first step [step 530], each of the clusters is evaluated to see whether it should be split.

According to the present embodiment, cluster splitting evaluation comprises establishing if the following conditions are met:
  a. There is a pre-determined minimum number of events that belong to the cluster.
  b. A word position has an entropy smaller than a splitting threshold (but not zero) and at least one word in that word position appeared in at least x % of the messages. The entropy of a word position is computed as:

$$h(j) = -\sum_{k=1}^{n} p_{kj} \cdot \log(p_{kj}),$$ ⟨Equation 2⟩ where n is the number of words in the dictionary and $p_{kj}$ is the probability that word k appears in position j, computed as $$p_{kj} = n_{kj}/n_c,$$ <Equation 3> where $n_{kj}$ is the number of times word k appeared in position j, and $n_c$ is the number of messages belonging to the cluster. In this context, entropy is effectively a measure of the degree of variability in a variable portion 109 of the template; when the degree of variability is low (but not zero), this is indicative that a relatively high proportion of the variables are in fact the same.

According to the present embodiment, when the two conditions a. and b. are met [step 535], a cluster is split into at least two clusters [step 540], and possibly more if more than one word meets or exceeds the x % threshold. Then, the process iterates and the next cluster is evaluated [step 530].

As shown in FIG. 6, cluster D 606 is shown as having been split into two clusters, D1 610 and D2 612. Cluster D1 in this example has arisen as a result of the occurrence of a relatively large number of log event messages having the same IP address 192.168.0.10; and all events, and the associated Count, having that IP address are assigned to cluster D1. All other events in the cluster D (i.e. those not having IP address 192.168.0.10), and the associated Count, are assigned to cluster D2, which is shown with an arbitrary IP address ppp.qqq.rr.sss representing all other IP addresses. Clusters D, D1 and D2 together form a so-called cluster tree, of which cluster D, generated using the cosine similarity criterion, is the root and clusters D1 and D2 are the branches.

According to embodiments of the invention, $x \leq 10\%$ has been found to provide satisfactory performance, with a minimum number of messages in a cluster being set as 1000.

In order to satisfy the 'consistency of cluster' requirement after splitting has occurred, each new incoming event is compared to the original, or root, cluster in each cluster tree in the order in which the original cluster of each tree was created. If a match exceeds the threshold, the event is then compared to each branch cluster in the tree and is assigned to the branch cluster which produces the highest matching value. It will be appreciated that each branch cluster may itself become split, if the events assigned to it satisfy criteria a. and b. above.

In an alternative embodiment (represented by the dotted lines representing alternative exit points from steps 525 and 540, the processes in FIG. 5a and FIG. 5b are combined, whereby cluster splitting becomes an online process wherein the cluster to which the latest event has just been assigned, as part of the cluster assignment process, is evaluated for splitting. Clearly, in this variant, cluster splitting would represent a higher overhead, in effect occurring after each event message is received, which could lead to delays in processing new event messages. However, there is no reason in principle, as long as there is sufficient processing power, why this variant should not be applied.

As already indicated, the output of the template generator module 412 to this point can be thought of as a forest of cluster trees, in which the branches of the tree represent splits based on the entropy criterion, and the tree roots are based on the cosine similarity criterion.

In terms of efficiency, according to an embodiment of the invention, the algorithm performs a single pass over the data, preserving word counts 603 for splits as it reads the messages. For example, if cluster D has 1000 entries and 300 of those entries satisfy the criteria a. and b., then a cluster D1 count is set to 300 and a cluster D2 count is set to 700, while the cluster D count is preserved as 1000. According to the present embodiment, creating the root of the forest is purely online, while the splitting phase, as described, can be performed online or periodically on selected clusters such that new messages are not held up for long. Experiments have shown that, despite the heuristic nature of the algorithm, it is capable of achieving clustering results that are both accurate in terms of recovering message templates, and also very similar to batch clustering on the same data.

According to the present embodiment, when a cluster is split, say creating branch clusters D1 and D2 in FIG. 6, the respective cluster assignments (440 in FIG. 7a) are changed to reflect the new cluster assignments.

The formation of clusters according to embodiments of the present invention can have a significant impact on log storage and indexing efficiency, as will now be described. The output of the log analyser 410 can be applied to the efficient indexing of the logs, reducing both space requirements and speeding up searches through the logs significantly over standard indexing. The clusters (and cluster assignments) that have been defined can serve as an index to each event, and coupled with the varying words, can produce a very fast and small index representing exactly all event logs.

Five log event datasets taken from various real-life systems in different fields of the IT world have been analysed according to embodiments of the present invention, in order to demonstrate the generality of the algorithm applied by the log analyser 410. The datasets comprise one hardware log (that of a printing press), one Windows Server event log (which represents an infrastructure environment) and two enterprise business application logs. Logs in which system problems were discovered, as well as logs from normal processing time of the systems, were carefully selected. Each of the logs was processed by the template generator module 412 to create sets of clusters, unique messages and word dictionaries.

In addition to clustering the messages into distinct clusters, for the purposes of the experiments, the template generator module 412 was adapted to keep track of the distinct message strings, number of distinct non-numeric words in the logs of each system, as well as statistical information about the messages, such as the average number of words and the median number of words in each message.

The table in FIG. 8 summarizes the results of running each of the datasets through the template generator module 412. For every data set the table shows the timeframe of the messages in the log, how many messages were processed (number of messages), how many distinct messages were in the logs (number of unique messages), the number of clusters they were grouped into (number of clusters), the number of distinct words that were discovered in the log (not including numeric strings), and the median number of words in a message.

The template generator module algorithm efficiently indexes the logs, both reducing space requirements and speeding up search through the logs significantly over standard indexing. The right hand column of the table demonstrates the scale of the reduced index size. This column shows the percentage by which the index size was reduced in the representation of the logs. In the cases of the business applications (Application 1 and Application 2), the reduction in size was up to 90%. This compression in representation of the logs is done on two levels. The first level of reduction consists of keeping track of unique messages and the number of times they occur rather than keeping track of every instance of every message. The second level of reduction consists of using the cluster as an index to the unique messages, coupled with keeping only the subsequent varying words of every unique pattern message, to produce a very fast and small index representing exactly all event logs. The 90% reduction is the saving of the clustering step compared to the first step of reduction—an index based on the unique messages. A 99% reduction is achieved over the naïve index which doesn't keep track of the unique messages.

The graph in FIG. 9 further demonstrates the reduction in size that the log analyser 410 provides for the Business Application 1 data, showing that, over a 6 month period, the number of unique (distinct) messages 905 grows at a steep rate (to over 40000 log event messages) while the number of clusters stays relatively very small (below 5000).

Such a reduced log file and improved indexing has many benefits, including in greatly increasing the efficiency of identifying atoms, as will be described below.

Atom Recogniser Module 414

According to an embodiment of the invention, the atom recogniser module 414 is arranged to identify sets of events (or, in fact, message cluster templates representing the events) that tend to occur together. In known systems, each process (and there may be plural processes occurring at any particular point in time) typically generates its own set of log event messages (where a set comprises one or more messages), and a log file is a union of the individual log sets. Consequently, it can be observed that the messages generated by a process are not often sequentially ordered: indeed, many systems are a-synchronic, making any ordering meaningless. The atom recogniser module 414 effectively parses the log file (or files) and identifies the individual sets of messages that belong to one process or failure. In effect, the atom recogniser module 414 provides an alternative representation of the full log file, as a collection of so-called atoms, where each atom comprises an identified set of one or more event messages produced by one process or failure.

According to an embodiment of the invention, such an alternative representation, which is stored in the processed log 470, can provide several advantages:

a. Event suppression and filtering—one atom is used instead a set of log event messages, which allows efficient representation of the data.

b. Analysis—each atom stands for one process or failure, and therefore representation by atoms is more meaningful than the full representation in a known log file. It has been appreciated that, unlike atoms, the same single log event message can appear in several different processes or failures, and therefore its occurrence does not necessarily describe any specific system state.

c. Reduction of noise—on the assumption that a process occurs every once in a while in the system, and causes a set of log event messages, the atom recogniser module 414 is able to identify this set as an atom that describes the process. In addition, the atom recogniser module 414 is able to identify atoms even in the presence of noise, for example, when some individual events were deleted, delayed or were wrongly assigned to a different time window, or where an intrinsic problem in the system (e.g. the process was stopped in the middle) occurred.

The operation of the atom recogniser module 414 will now be described by way of example according to an embodiment of the invention.

First, let $D_1, D_2, \ldots, D_N$, where each $D_i$ represents a time window, represent N different sets of elements, each consisting of a finite set of values taken from a finite alphabet $v_1, v_2, \ldots, v_T$, (where each $v_i$ represents a cluster ID 440 in an overall set of T clusters in a cluster dictionary). In effect, $D_i$ can be thought of as a binary vector representing which clusters, out of the entire set of size T, occurred in the i'th time window. For example, if an exemplary dictionary consists of five cluster types, A, B, C, D1, D2, the alphabet would be A, B, C, D1, D2 (T=5). Suppose then there is a log which starts at 8:00 AM and ends at 9:00 AM. The log could be split into 60 time windows, each lasting 1 minute (then, i=1, . . . , 60), such that, for example, between 8:01 AM-8:02 AM (i=2) events A and B occurred (and not C, D1 or D2), then $D_2$=[1 1 0 0 0], where the order of the events in the alphabet is A, B, C, D1, D2.

It is assumed that the content of each set $D_i$ consists of at most L smaller sets, denoted as atoms. The set of all atoms is then denoted as A, and consists of K elements $A=\{A_1, A_2, \ldots, A_K\}$, where N>>K. Each atom $A_j$ holds a set of values $A_j=\{v_{j1}, v_{j2}, \ldots, v_{jw}\}$; where each atom is a vector of 0's and 1's, where $v_{j1}=1$ if message cluster type $v_1$ ($v_1$ is the cluster ID) is present in the atom. The atoms are not necessarily distinct, nor do they consist of all available values.

A representation of the set $D_i$ using A can be denoted as $F(A,R_i)$, where $R_i$ is a set of indices, and $$F(A, R_i) = \bigcup_{j \in R_i} A_j.$$

Then, F(A,R) denotes the set of all representations, $F(A,R) = \{F(A,R_i) | 1 \leq i \leq |R|\}$. The atom recogniser module 414 operates to find a set of atoms A and a set of representations R that minimize the sum of distances between $F(A,R_i)$ and $D_i$ for $1 \leq i \leq N$. Therefore, a respective cost function can be defined as:

$$\{A, R\} = \underset{A,R}{\operatorname{argmin}} \sum_{i=1}^{N} d(D_i, F(A, R_i)) \text{ s.t. } \forall_i \ |R_i| \leq L, \quad \langle\text{Equation 4}\rangle$$

$$|A| \leq k,$$

where d is a distance metric between sets $D_i$ and $F(A,R_i)$. The output of the atom recogniser module 414 depends heavily on the definition of the distance function d.

According to one embodiment, a relatively simple distance function d counts the number of elements that are not common in the two sets, and normalizes it by the size of $D_i$, $$d(D_i, F(A, R_i)) = \frac{|D_i \otimes F(A, R_i)|}{|D_i|}, \quad \langle\text{Equation 5}\rangle$$

where $\otimes$ is the XOR operator that returns the set of elements that appear in one set and not in the other.

Put another way, once the atoms have been found, each time window vector $D_i$ can be represented by a number of atoms. For example, suppose that $D_i$=[1 1 0 0 0], as in the example above, and there is a set of atoms: A1=[1 0 0 0 0], A2=[0 1 1 0 0], and A3=[0 0 0 1 0], a representation of D, $R_i$, could be {A1, A2}. $F(A,R_i)$ would then be [1 1 1 0 0], which represents all of the clusters in $D_i$, but also an extra cluster, C. Therefore, in this case, there is an error referred to as a representation error, which would be 1, before normalization (i.e. the numerator of equation 5).

However, such a simple distance function is unable to consider cases in which only part of the atom appears in $D_i$ due to, for example, missing log entries. If this is perceived to be important, then an alternative distance function, which uses a slack parameter, r, can be applied:

$$d^r(D_i, F(A,R_i)) = d(D_i, B(F(A,R_i), D_i, r)), \quad \langle\text{Equation 6}\rangle$$

where $$B(F(A,R_i), D_i, r) = F(\tilde{A}, R_i), \quad \langle\text{Equation 7}\rangle$$

and $\tilde{A}_i = \underset{\tilde{A}}{\operatorname{argmin}} \ d(D_i, F(\tilde{A}, R_i))$ for $\tilde{A}_i \subset A_i$, $|\tilde{A}_i| \geq r \cdot |A_i|$.

That is the distance function is permitted to consider only a portion r of the elements of each atom in the representation, thereby reducing the penalty for mismatches. When r=1, the function $d^r$ is identical to d.

As the solution of Equation 4 is combinatorial in its nature, an iterative scheme can be applied to minimizing it. Calculating $d(D_i, F(A,R_i))$, given $R_i$ and A is relatively straightforward; by picking at least $r \cdot |A_j|$ elements from $A_j$ for each $j \in R_i$, whose union most resembles Di.

In each iteration, there are two stages: a representation stage and an atom optimization stage.

Representation stage: the set A is fixed, and $$R_i = \underset{R_i}{\operatorname{argmin}} d^r(D_i, F(A, R_i))$$

is solved for all i. This is achieved by adding one atom after the other to the representation. In each stage the added atom is the one that best minimizes the distance. The process stops when the distance is no longer minimized, or when $|R_i|=L$.

Atom optimization stage: A is changed in order to minimize the distance of the representation to D. This is done one atom after the other. When optimizing $A_i$, all other atoms are fixed, and only the data sets that include $A_i$ in their representation (other data sets will not effect $A_i$) are considered. For each such data set a representation error set $E_i$ is defined, $$E_i = \{D_i / F(A, \{R_i / i\})\}, \qquad \text{<Equation 8>}$$

where the operator '/' stands for set subtraction. $E_i$ in practice holds all the elements in $D_i$ that are not yet represented by all other atoms except $A_i$. $A_i$ is then redefined in order to better approximate all the representation error sets.

In each iteration, the cost function in Equation 4 is reduced, and therefore the algorithm is guaranteed to converge to a minimum value. As the solution is local, several heuristic operations are done in order to force a more global solution (such as replacing identical atoms or atoms that contain other atoms).

Atom optimisation can involve a number of additional steps. For example, a certain atom can effectively be removed by uniting it with another atom, if it is apparent that the two (or more) atoms tend to appear together; thus reducing the number of individual atoms. In addition, or alternatively, when there appear to be regularities in the occurrence of a representation error (i.e. the same representation error arises regularly—e.g. a same one message cluster to complete an atom is regularly missing from the time window), a new atom can be formed (in this case, omitting the message cluster) such that, in future, the representation error is avoided (i.e. it is represented by the new atom). Many other ways of optimising the atoms will become apparent to the skilled person on reading the present description.

In practice, the values of K, L and r are selected heuristically, in order to maximise atom detection rate, using reasonable assumptions and knowledge of the system and the origin of the data. Initial values can be selected by testing different combinations of values against synthetic data. For example, in one experiment, a set of K 'true' atoms were randomly selected from an alphabet of size 200 (each atom including 8 elements). Then, the value of r was fixed to generate the input sets D. Each set $D_i$ was generated by a union of random L atoms. From each of the atoms only r of the elements were taken. In addition, some noise was added to each set by switching on/off n elements (in effect, including or omitting the respective log messages). Finally, the algorithm was executed after supplying it with the parameters (k, L, r), and with the input sets D. The success rate of the algorithm was measured by the number of successful atom detections out of k.

Figure 10A:
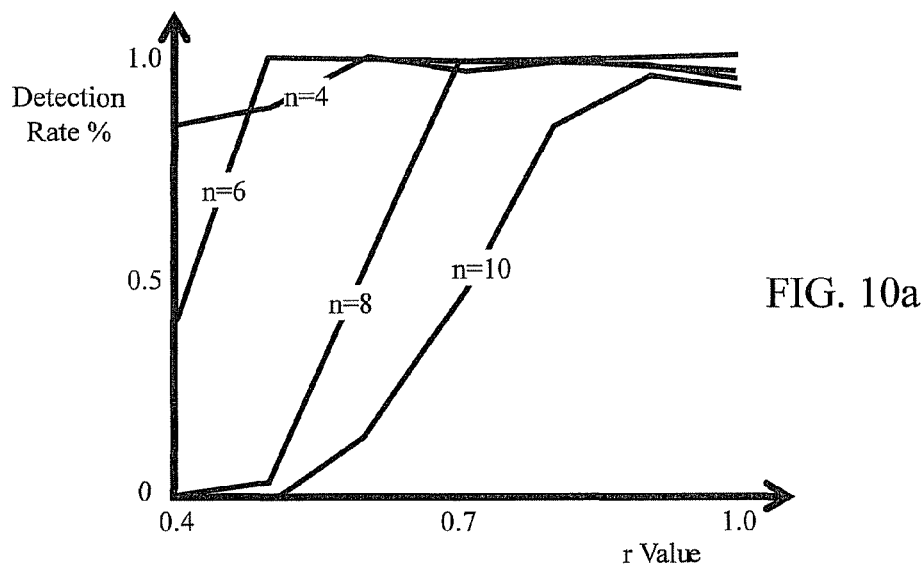
FIGS. 10a, 10b and 10c are graphs which illustrate how the cluster detection performance of embodiments of the invention vary depending on parameter selection.
Figure 10B:
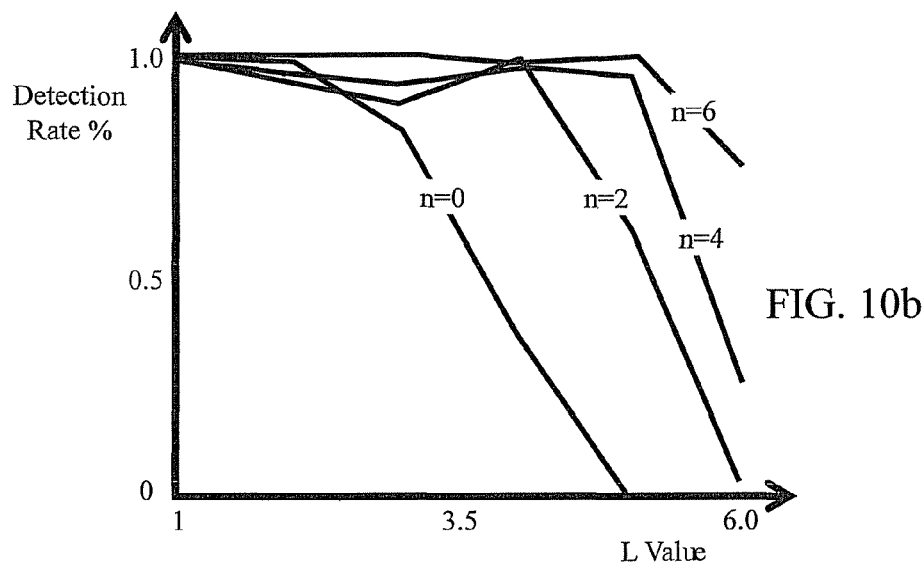
Figure 10C:
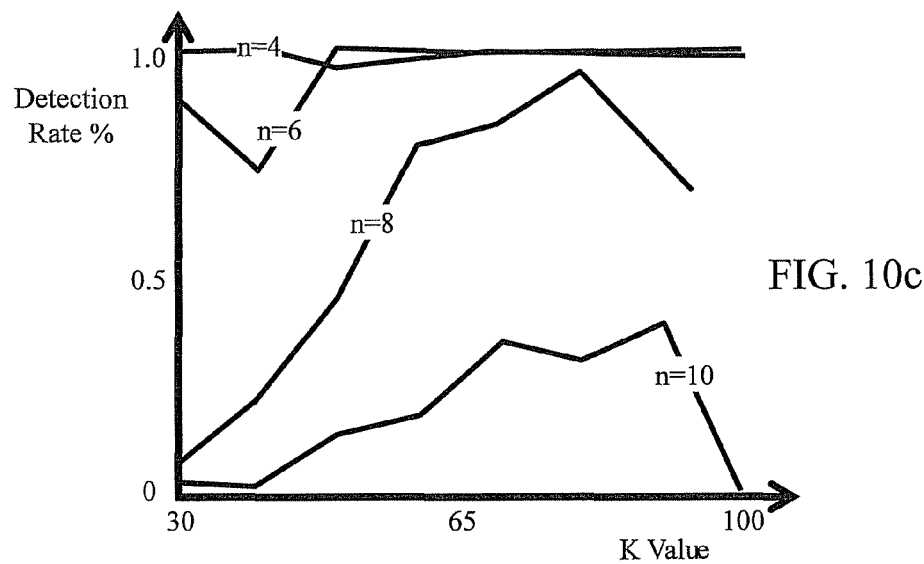

Some exemplary results of varying the values of K, L and r based on the preceding model are illustrated in the graphs in FIGS. 10a, 10b and 10c.

The graph in FIG. 10a represents an experiment in which K=50, L=3, N=3000, and r was varied (between 0.4 and 1). The rates of successful detections with noise levels n=4, 6, 8, 10 are shown. It was found that detection performance increased with a reduced noise level: a noise level below 6 was found to produce a detection rate above 80%. Noise levels of 6, 8 or 10 increasingly led to a diminished number of detections as the value of r was increased.

The graph in FIG. 10b represents an experiment in which r=0.6, and L varies between 1 and 6, with noise levels of n=0, 2, 4, 6. It can be seen that detection rate diminished as L increased, but that, for a given value of L, detection rate varied in inverse relation to noise. Detection rates were found to be high (above 80%) for noise levels above 6 but tailed off for L values below 6.

The graph in FIG. 10c represents an experiment in which r=0.6, and L=3, while K varies between 30 and 100 in steps of 10, and with noise levels of n=4, 6, 8, 10. It was found that detection rates were high (above 80%) for n<6 and, when n=8 or 10, there is an optimum detection rate in the range of 80<L<95, with detection performance tailing off either side of this range.

Overall, the results in FIG. 10 demonstrate that the atom recogniser module 414 is efficient at recognising atoms even when noise levels are relatively high. It is also apparent how to establish appropriate values for K, L and r by experiment and heuristically. It is envisaged that in alternative implementations and embodiments of the atom recogniser module 414 it would be feasible to modify the atom recogniser module 414 to, effectively, omit the need for the initial setting of K and L values, and to better avoid local minima solutions.

The operation and output of the atom recogniser module 414, to produce a processed log 470, can be illustrated graphically by reference to FIG. 11a and FIG. 11b. FIG. 11a illustrates a number of time windows $D_1$-$D_N$; where each $D_i$ represents a binary vector having T=16 (for example, $D_1$=[1 0 1 0 0 0 0 1 0 0 1 0 1 1 0 1] etc.), where each element in the vector represents the presence or absence of a message cluster ID 1105. As represented, the dark squares (a binary '1') in each time window, $D_i$, represent the presence of a respective message cluster within that time window and the white squares (a binary "0") represent the absence of a respective cluster. The atom recogniser module 414 evaluates the data in the time windows, as described above, and is able to define atoms $A_j$ therefrom, as illustrated in FIG. 11b. As shown in FIG. 11b, a first atom $A_1$ and a second atom $A_2$ are exemplified as having the following binary representations:

$A_1$=[0000000100100101] and $A_2$=[1 0 1 0 0 0 0 0 0 0 0 1 0 0 0]

where the shaded squares in the atoms $A_j$ correspond to respective message cluster IDs that make up the atom, and the shaded squares in the time windows $D_i$ include a designation (in this instance A1 or A2) representing the respective atoms(s) that fell within the respective time window.

In this example, each atom is represented with a full vector (T=16) matching the dimensions of the time window vectors $D_i$ for convenience and ease of understanding of the illustration. Alternatively, each atom could be represented by its clusters only. For example, atom $A_i$ could be represented as {8, 11, 14, 16}, where each number represents a message cluster ID.

In addition, referring to the shaded and numbered squares in the data portion of FIG. 11b, it may be seen that time windows $D_1$, $D_2$, $D_4$, $D_5$ and $D_N$ each include atom $A_1$; likewise time windows $D_1$, $D_3$, $D_4$ and $D_N$ each include atom $A_2$. It will be apparent that $D_3$ has been characterised as including atom $A_2$ despite a missing cluster in its first location 1110; likewise $D_4$ has been characterised as including atom $A_1$ despite a missing cluster in its $14^{th}$ location 1120. This illustrates how the algorithm copes with noise (in this instance, missing clusters), as described above.

The data in FIG. 11b effectively represents the processed log 470, in which each time window $D_i$ may be characterised by a number of atoms, where each atom is defined by a number of message clusters. For example, time window $D_1$ can be represented by the atoms $\{A_1, A_2\}$, time window $D_2$ can be represented by the atom $\{A_1\}$ etc. Of course, any other convenient data structure may be used to represent the processed log 470. In any event, the processed system log 470 can be used for various system analysis tasks, as will be described in more detail below.

Thus far, it has been shown how to receive one or more log files and transform the event logs from semi-structured text to machine readable form in the processed log 470. Once in machine readable form, the data can be used in a number of different, advantageous scenarios for operations of large enterprise IT systems. A log analyser 410 according to an embodiment of the invention was applied to various real-life log files, as will now be described. In the following experiments, the following values were used in the atom recogniser module 414: k=80, L=3, r=0.51.

System Diagnosis

A first exemplary use case of the processed log 470 by the analytics engine 420 is to aid in diagnosis of system problems. In most computer systems, indications of problems stem from abnormal measurement values associated with computer system behaviour, such as transaction response time or throughput. This behaviour information is generally referred to herein as system monitor information 482. Such measurements are typically made and reported to human operators (i.e. system administrators) by known system and/or network monitoring applications (or 'monitors') 480 such as OpenView™ software available from Hewlett Packard® Company and Microsoft NT 4.0 Performance Counters available from Microsoft®. When monitors 480 indicate a problem, the human operators 484 typically need to discover the root cause, quite often by sifting through huge amounts of unprocessed, semi-structured log files (e.g. raw log files 430). Monitors 480 typically measure system behaviour, such as CPU, memory and network utilisation, and may present the respective system monitor information graphically.

It is known to use machine learning methods such as Bayesian network classifiers and clustering using real-valued monitors to assist in such system diagnosis. It is possible to apply such known methods to use the output of the log analyser 414, as exemplified herein, to assist in system diagnosis, for example, by computing an output of the log analyser 414 to match an input frequency (for example in 1 to 5 minute windows) of the monitors used to detect problems. In effect, this turns the log events to temporal measurements enabling the application of existing learning technologies to help classify and describe problem periods in system operation. In other words, atoms that are seen to occur during the occurrence of a system problem are likely to be associated with the problem. Identification during a system problem of an atom, which may be defined by many message clusters from disparate log files, has been found by the present inventors to be of far more immediate use than having to rely on analysing the many concurrent events in plural individual log files.

Figure 12:
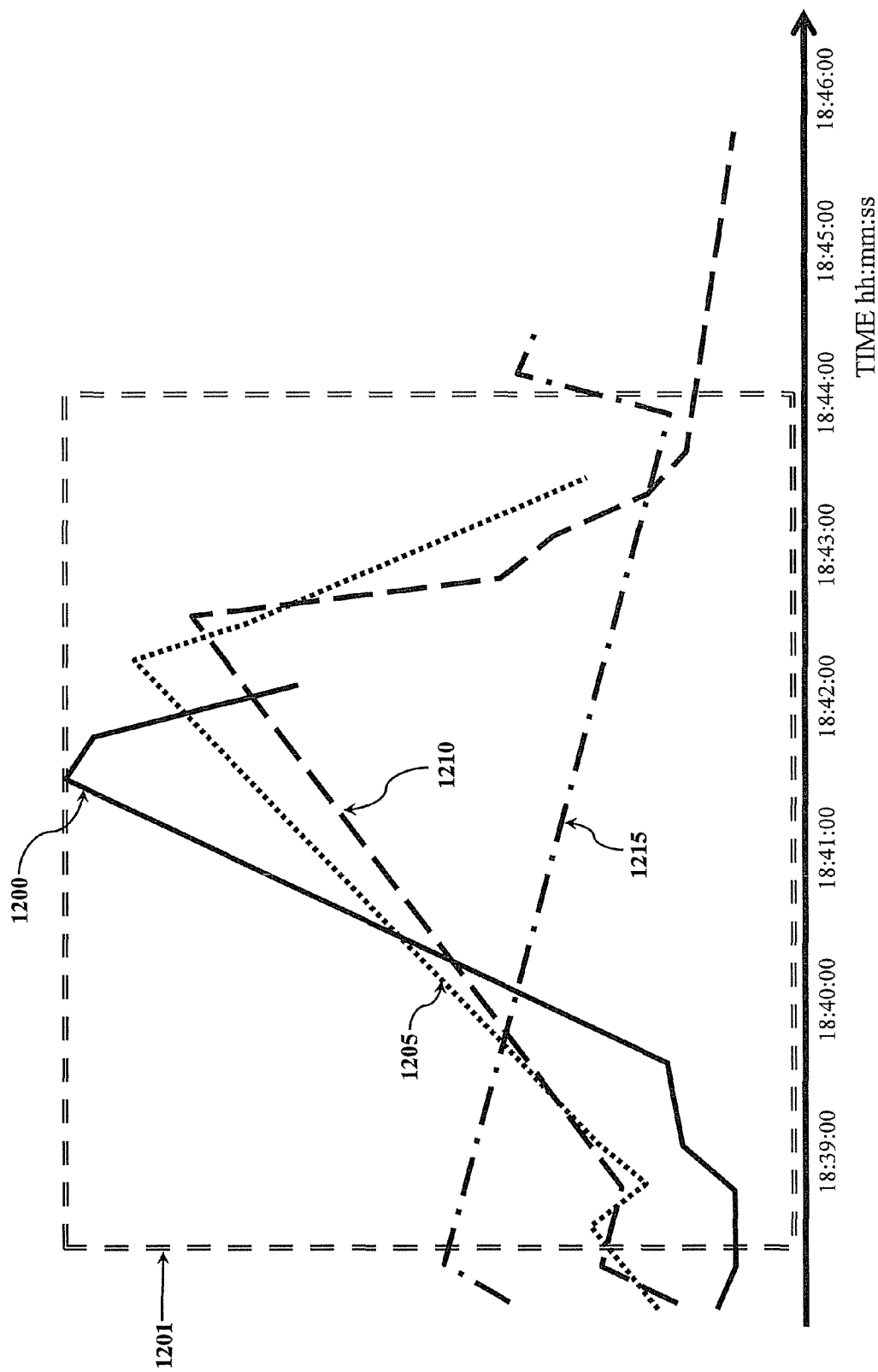
FIG. 12 is an exemplary graph of computer system performance against time produced by a known system monitor.

An example of applying an embodiment of the present system to system diagnosis, in particular to root cause analysis for application performance debugging, will now be described with reference to the graph in FIG. 12. The graph in FIG. 12 illustrates a graphical depiction of various system monitor metrics, generated by a known system monitor 480, which was monitoring a distributed computing system arrangement (the specific configuration or other details of the system are not relevant to the present description). The x-axis of the graph is time (though the scale of the graph is not relevant to the present description) and the y-axis represents various performance measures associated with each of the respective metrics (again, scale is not important). As can be seen, there is a large amount of data represented in the graph.

During routine monitoring of performance in the distributed computing system arrangement, the system monitor 480 produced a spike 1200 in transaction response time in FIG. 12. In addition, the system monitor showed that, in the same timeframe (indicated by bounded region 1201) database CPU usage 1205 and application server CPU usage 1210 were increasing, despite the fact that a number of connections 1215 to the application server was decreasing.

In effect, the system monitor 480 indicated multiple symptoms of a performance problem occurring in the distributed system, but without an indication of what might be causing it. The different components that composed the distributed computing system arrangement all had corresponding logs with error messages (events) that occurred at the time of the spike. However, there was no clear way to disseminate them. By applying the log analyser 410, according to an embodiment of the invention, to process the multiple logs, a clear picture of the environment, derived from information and error messages from multiple sources, was generated in the context of log message timeline and order, as illustrated in the graph in FIG. 13.

Figure 13:
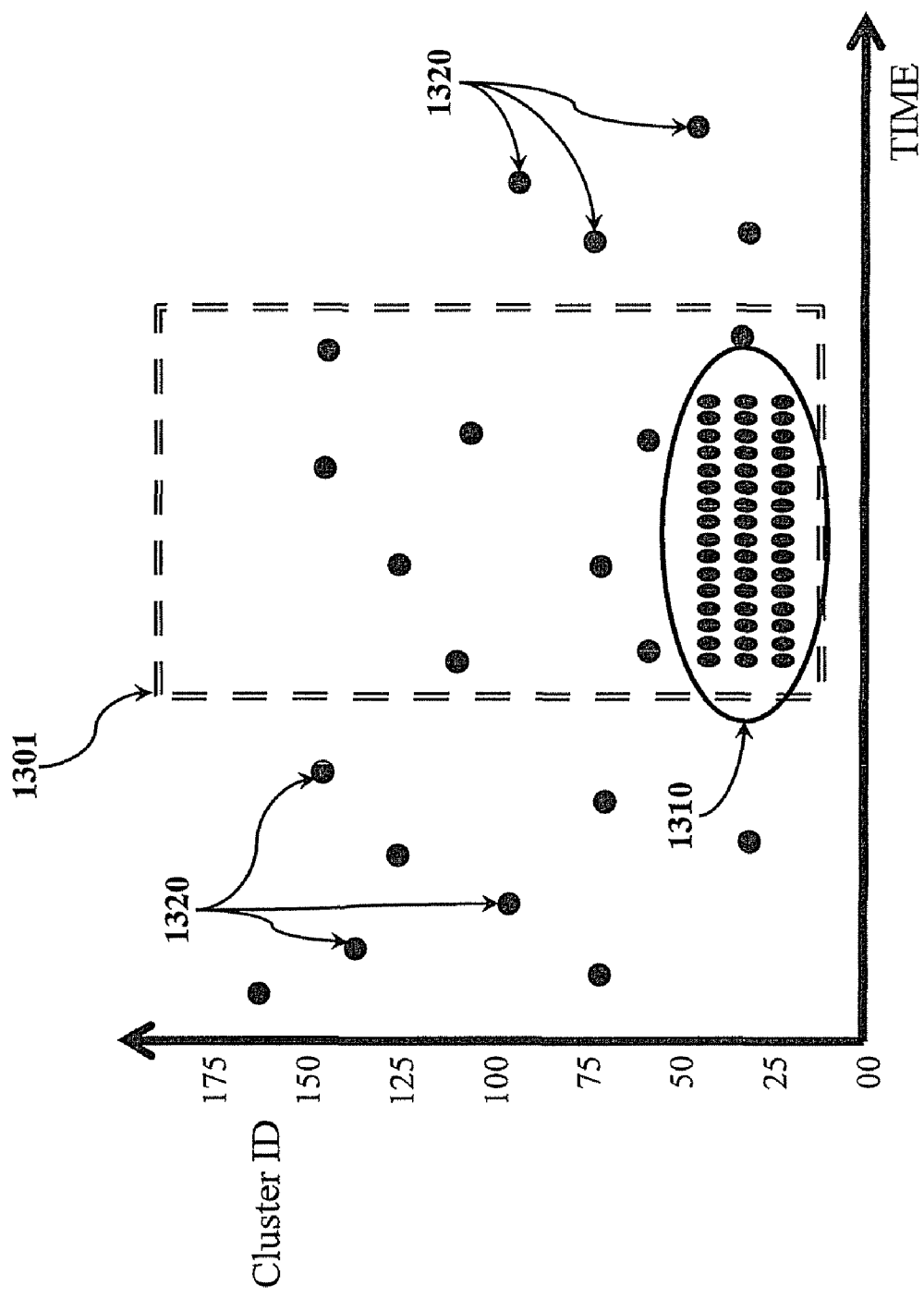
FIG. 13 is a graph identifying message clusters that are found to occur over the period of time of FIG. 12.

FIG. 13 shows a graph generated by the analytics engine 420, in effect visualising error messages occurring at the time of associated system errors, which were found to be associated with the performance degradation shown in FIG. 12. The errors were visualized by the analytics engine 420 after dictionary creation processing according to an embodiment of the present invention. The y-axis of FIG. 13 represents the cluster assignments (IDs) 440 generated by the template generator module 412. The x-axis is the time. Every dot in the graph represents an actual event from the log, showing its mapping to one of the discovered clusters. The bounded period 1301 corresponds to the timeframe 1201 containing the spike 1200 in response time in the graph in FIG. 12. The corresponding log error messages (events) relevant to the problem are clearly visible in the graph, as the regularly-spaced arrangement of dots within the oval region 1310. Other dots 1320, which appear to be arbitrarily positioned in the graph, do not detract from a recognition of the problematic events 1310. Of course, the same graph could easily be produced showing atoms in addition to or instead of individual clusters, by reference to the assignments in the processed log 470.

Once processed according to an embodiment of the invention, error messages from multiple sources were visualized together, as shown in FIG. 13, indicating order of appearance and cluster classification. The graphical representation in FIG. 13 is clearly far simpler than that shown in FIG. 12. Moreover, the representation in FIG. 13 is directly related to the errors that were causing performance degradation.

Analyzing the messages identified by FIG. 13 assisted in isolating the root problem that caused the system errors—a java IllegalStateException message:
   java.lang.IllegalStateException: getAttribute: Session already invalidated Once identified, explanations and solutions were easily found and applied by reference to on-line sources, such as:
   http://forums.sun.com/thread.jspa?threadID=5129793

Use of atoms to diagnose system problems can be further appreciated with reference to the following table produced by the analytics engine 420.

| Failure Type diagnosis Using Atoms | | |
|---|---|---|
| Failure type 1: Atom 78 | Failure Type 2: Atom 14 | Failure Type 3: Atom 79 |
| failed to get coverage, failed to get list of entities keys | failed to cover req invalid values in removecoverage input frec parameter | failed to post common settings the project session authentication has failed. |
| failed to complete the action cannot create new test duplicate test name 'xxx' | failed to complete the action cannot create new test duplicate test name 'xxx' | failed to retrieve the meta data of project 'xxx' the project session authentication has failed |
| failed to get test value unexpected failure in getvaluepostprocess | failed to get test value unexpected failure in getvaluepostprocess | failed to get licenses for xx project session the project session authentication has failed. |
| failed to post design steps values cannot add new design step to test #xxx test #xxx not found | failed to post design steps values cannot add new design step to test #xxx test #xxx not found | failed to get the specified common settings the project session authentication has failed. |
| | failed to post req, failed to build hierarchical item descriptor | error creating request from x\xxx\xx conststr gettestsetvalue, failed to lock object the project session authentication has failed. exception in getting sequence value login has timed out. |

This table shows atoms that were identified to coincide with three system failure types in the Business Application 1 data set shown in FIG. 8. The atoms are shown with their corresponding event clusters (in each column).

It is evident that there are shared events in Atom 78 and Atom 14 (underlined), although the failure modes in the system are different in these two cases. This clearly illustrates the difficulty of diagnosing problems by looking only at raw event logs. The messages in Atom 79 represent a third failure mode, representing the messages occurring after a session authentication failure. When the timeline of when this atom appeared was considered, it was seen to be repeating. Some investigation showed that the repeating occurrence of the atom was due to an old script that was being executed at a regular interval that went undetected for months until this analysis was undertaken.

From the foregoing description, it is apparent that information received from a system monitor, indicating failures, can be used in tandem with log analyser information, in order to diagnose systems failures. Of course, once it is known which atoms, or combinations of atoms, occur concurrently with (or, indeed, precede) system failures, it would not be essential to refer to monitor information in order to diagnose recurrences of the problems.

System Visualisation

A second exemplary use case of the processed log 470 by the analytics engine 420 is for visualisation of system event logs over time, for gaining a better understanding of the overall system operation. While this use case is similar to the first in many respects, visualisation of the log events over time produces views that enable quick and intuitive understanding of normal system operation, such as reboots, normal periodic processes (e.g., database partition), and abnormal operation such as processes that are running amok, while not causing any detectable problem at the application level (at least to begin with). Whereas in the first use case the diagnosis of a specific problem that occurred is a supervised learning problem, this second use case can be unsupervised, leveraging visualisation and additional unsupervised techniques for early detection of anomalies or undesirable behavioural patterns from the logs.

An example of applying an embodiment of the invention to visualisation is illustrated in FIG. 14. In the visualisation, the x-axis of the graph represents time and the y-axis represents cluster ID (assignment 440). The scales of the axes are not important. As demonstrated by the visualization, further information about the system's behaviour, both normal and abnormal, can be obtained. For example, the regions surrounded by ellipses 1400 represent groups of log messages, represented by their respective cluster ID, that recur regularly, and, upon investigation, were identified as belonging to the normal shutdown and startup processes of a server (i.e. rebooting). Visualization uses messages from system logs following the dictionary creation by the template generator module 412. The rectangular bounded region 1405 represents a time when a problem occurred in the system; the marked message clusters 1410 that appear in this period were deemed to describe the root cause of the problem; which was found to be Failed processing http request report_transaction, from remote Host:5.55.55.55; Failed to acquire lock for publishing sample.

As with FIG. 13, the visualization could be enacted with atom ID rather than cluster ID, with similar results.

The above embodiments are to be understood as illustrative examples of the invention. Further embodiments of the invention are envisaged. It is to be understood that any feature described in relation to any one embodiment may be used alone, or, if the context permits, in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An automated method, comprising:
receiving event messages associated with one or more computer system event logs, each event message including event text;
determining a set of message clusters, each cluster in the set identifying a template text that represents one or more event messages across the one or more event logs;
assigning each received event message to a message cluster of the set according to a measure of similarity between the respective event text of the event message and the template text of the message cluster; and
periodically splitting message clusters on the basis of pre-determined splitting criteria,
wherein the pre-determined splitting criteria includes greater than a minimum number of event messages being assigned to a message cluster.

2. The automated system of claim 1, comprising receiving computer system behaviour information over one or more periods of time, and determining which message clusters coincide with particular kinds of system behaviour.

3. The automated system of claim 2, comprising using the determination of which message clusters coincide with particular kinds of system behaviour to diagnose current, or identify potential future, performance problems in the computer system.

4. The automated method of claim 1, wherein determining the set of message clusters includes comparing the event text of each received event message with the template text of the message clusters according to a pre-determined cluster sequence.

5. The automated method of claim 4, wherein the pre-determined cluster sequence is determined to be an order in which the message clusters are generated.

6. The automated method of claim 5, including assigning an event message to a message cluster according to a first comparison in the sequence that produces a measure of similarity that exceeds a pre-determined similarity threshold, and, if there is no comparison that exceeds the pre-determined threshold, creating at the end of the sequence a new message cluster comprising a template text using the event text.

7. The automated method of claim 4, wherein the comparing applies a word order sensitive cosine similarity measure.

8. The automated method of claim 7, wherein the word order sensitive cosine similarity measure includes a number of identical words in each word position of each event message and a number words in each event message.

9. The automated method of claim 1, wherein the pre-determined splitting criteria further includes a non-zero word position entropy of a variable event text word position across all event messages assigned to the message cluster being below a pre-determined entropy threshold.

10. The automated method of claim 9, wherein a message cluster that is split becomes a root cluster and a cluster that is split therefrom becomes a branch cluster of the root cluster, and at least a first branch cluster is generated having a template text including, in a respective variable event text word position thereof, the variable word value that is responsible for the word position entropy being below the pre-determined entropy threshold.

11. The automated method of claim 1, further comprising determining a plurality of atoms, each comprising one or more message clusters which relate to the same system process or failure.

12. The automated method of claim 11, comprising identifying message clusters that tend to occur together within pre-determined time windows.

13. The automated method of claim 12, comprising identifying, as an atom, a pattern of clusters that tends to occur repeatedly across each of a plurality of time windows.

14. The automated method of claim 13, comprising minimising a cost function using an iterative process to identify atoms.

15. The automated method of claim 13, comprising receiving computer system behaviour information over one or more periods of time, and determining which atoms coincide with particular kinds of system behaviour.

16. The automated system of claim 15, comprising using the determination of which atoms coincide with particular kinds of system behaviour to diagnose current, or identify potential future, performance problems in the computer system.

17. A computer implemented method of diagnosing a computer system problem, comprising:
receiving computer system behaviour information over one or more periods of time, the system behaviour information indicating a system problem;
receiving event messages associated with one or more system event logs over the one or more periods of time, each event message including event text;
determining a set of message clusters, each comprising a template text, representative of the event messages across the one or more event logs;
assigning each event message to a message cluster of the set of message clusters according to a measure of similarity between the respective event text of the event message and the template text of the message cluster;
determining which event messages coincide with the system problem; and
using the determination of which event messages coincide with the system problem to diagnose a source of the system problem,
wherein determining the set of message clusters includes a degree of variability of word positions within the event messages of each message cluster and words within each position being below a pre-determined threshold.

18. A computer implemented method of diagnosing a computer system problem, comprising:
receiving computer system behaviour information over one or more periods of time, the system behaviour information indicating a system problem;
receiving event messages associated with one or more system event logs over the one or more periods of time, each event message including event text;
determining a set of message clusters, each comprising a template text, representative of the event messages across the one or more event logs;
assigning each event message to a message cluster of the set of message clusters according to a measure of similarity between the respective event text of the event message and the template text of the message cluster;
determining which event messages coincide with the system problem; and using the determination of which event messages coincide with the system problem to diagnose a source of the system problem,
wherein assigning each event message to a message cluster of the set of message clusters includes comparing each event message to the message clusters in an order in which the message clusters are created and assigning each event message to a first message cluster in which a threshold of the measure of similarity is exceeded.

* * * * *

UNITED STATES PATENT AND TRADEMARK OFFICE
CERTIFICATE OF CORRECTION

PATENT NO.         : 8,209,567 B2
APPLICATION NO.    : 12/695780
DATED              : June 26, 2012
INVENTOR(S)        : Ira Cohen et al.

Page 1 of 1

It is certified that error appears in the above-identified patent and that said Letters Patent is hereby corrected as shown below:

In column 19, line 28, in Claim 2, delete "system" and insert -- method --, therefor.

In column 19, line 32, in Claim 3, delete "system" and insert -- method --, therefor.

In column 20, line 22, in Claim 16, delete "system" and insert -- method --, therefor.

Signed and Sealed this
Twenty-second Day of January, 2013

David J. Kappos
*Director of the United States Patent and Trademark Office*